United States Patent [19]
Henrion

[11] Patent Number: 4,932,261
[45] Date of Patent: Jun. 12, 1990

[54] MICRO-MACHINED ACCELEROMETER WITH TILT COMPENSATION

[75] Inventor: W. S. Henrion, Austin, Tex.

[73] Assignee: Triton Technologies, Inc., Austin, Tex.

[21] Appl. No.: 370,256

[22] Filed: Jun. 22, 1989

Related U.S. Application Data

[63] Continuation-in-part of Ser. No. 209,415, Jun. 20, 1988.

[51] Int. Cl.⁵ .......................................... G01P 15/13
[52] U.S. Cl. ..................................... 73/517 B; 73/654
[58] Field of Search .............. 73/517 B, 654; 367/118, 367/129, 181

[56] References Cited

U.S. PATENT DOCUMENTS 3,911,738 10/1975 Fischer ............................... 73/517 B
4,611,491 9/1986 Brown et al. ...................... 73/517 B Primary Examiner—John Chapman
Attorney, Agent, or Firm—Dodge, Bush & Moseley

[57] ABSTRACT

A spring-mass-support structure is arranged as an accelerometer with two electrostatic feedback loops so as to measure two components of acceleration. Two of such accelerometers are advantageously used on a submerged platform to determine the direction of a sound source in a body of water. One of such feedback loops of each accelerometer is used to measure low frequency gravitational acceleration applied to the platform as a result of the tilt of the platform due to the action of current and wave action of the water. The other of the feedback loops of each accelerometer measures sound wave induced acceleration on the platform. The gravitational acceleration of each accelerometer is used to compensate the higher frequency acceleration for the effect of tilt of the platform.

4 Claims, 16 Drawing Sheets

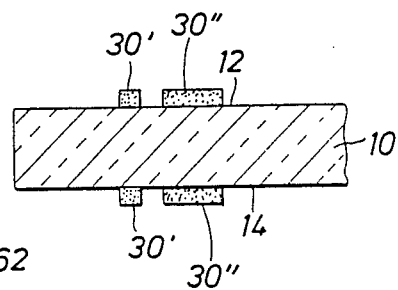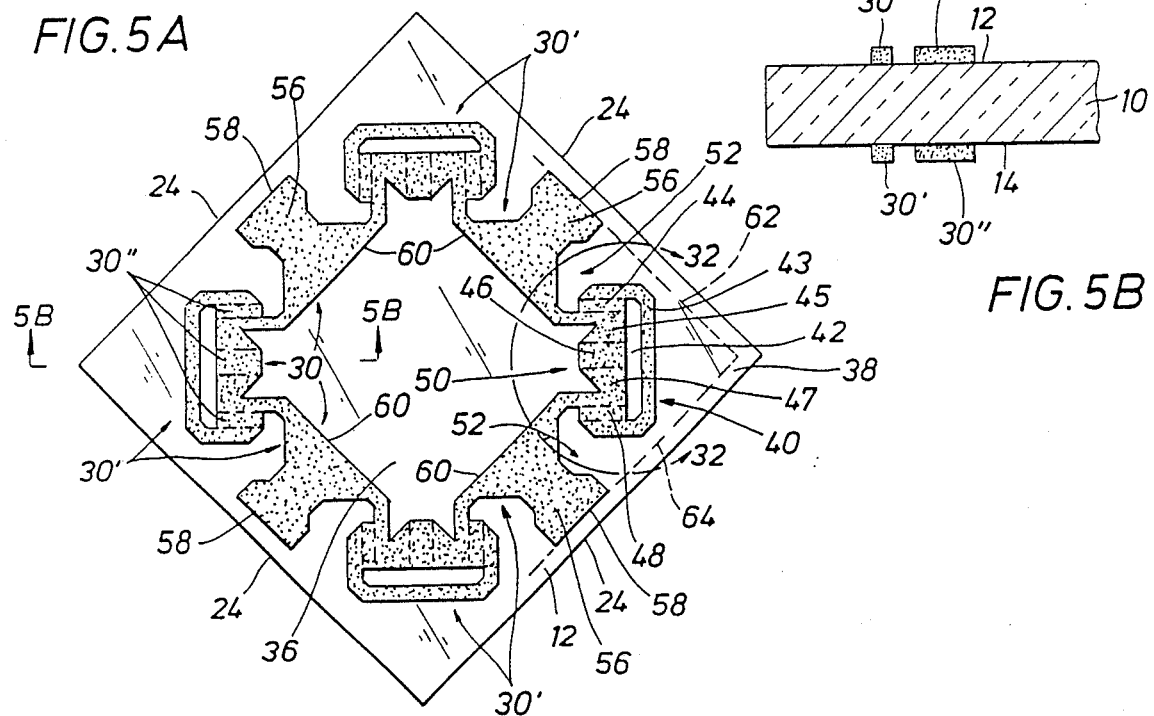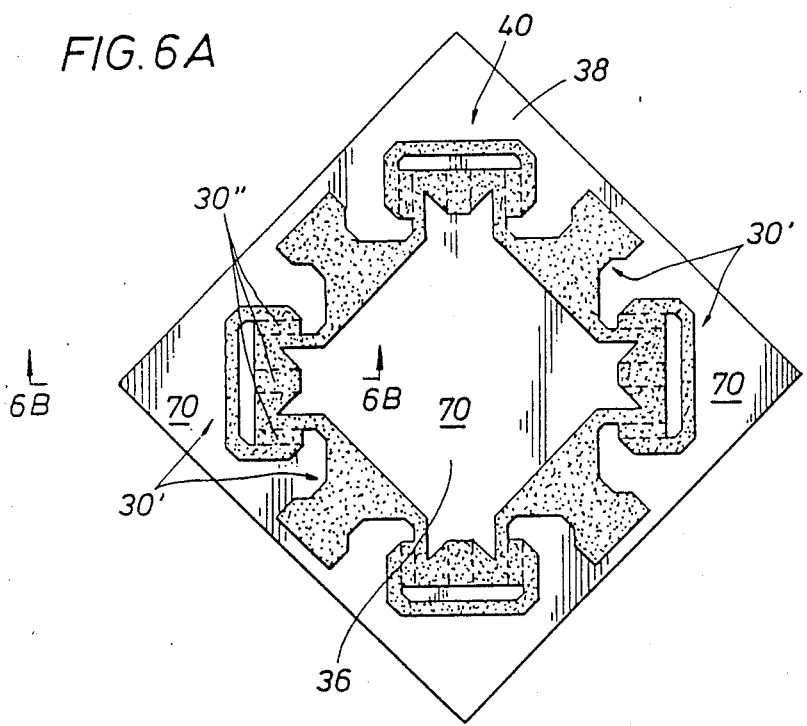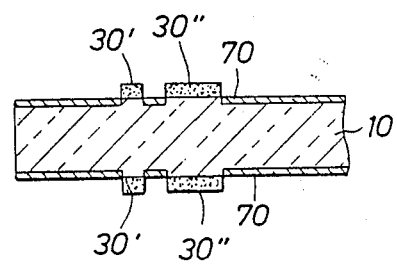

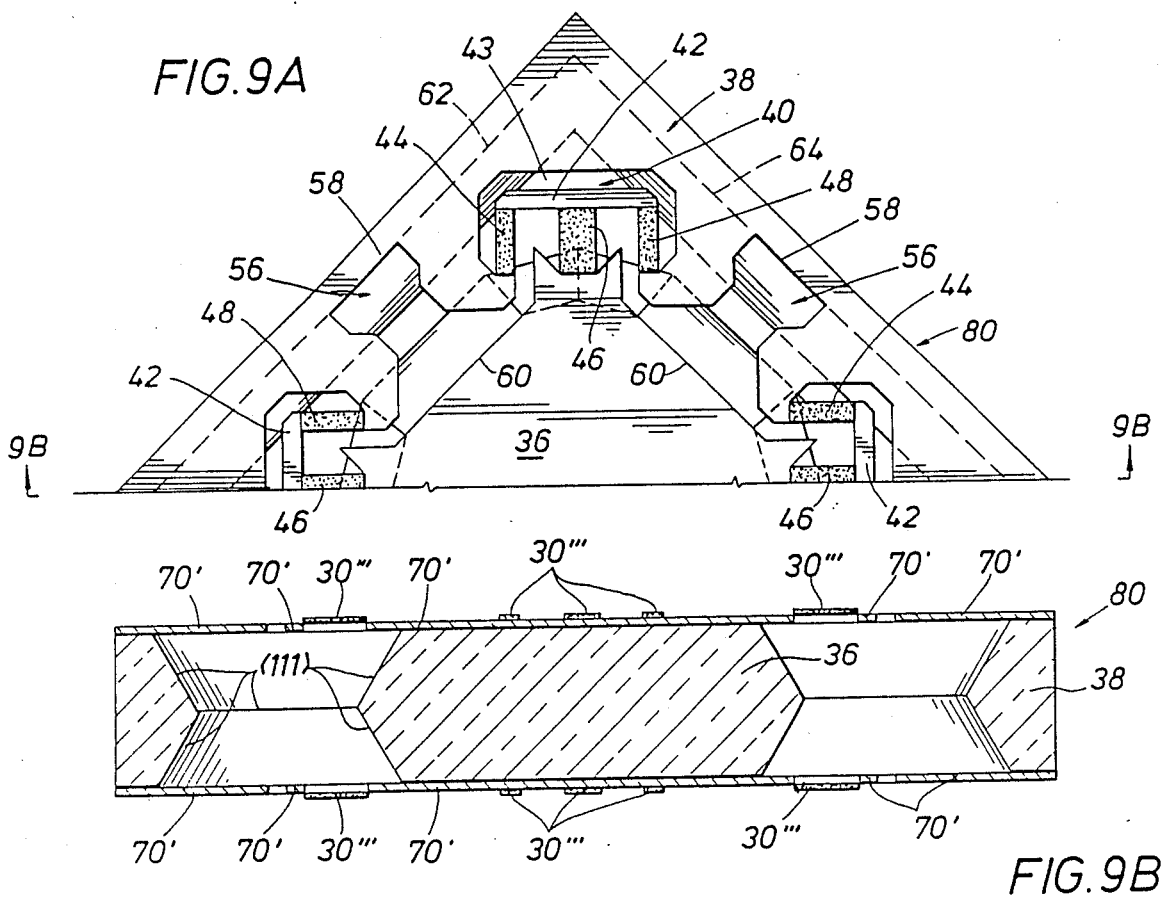
FIG.9A
FIG.9B
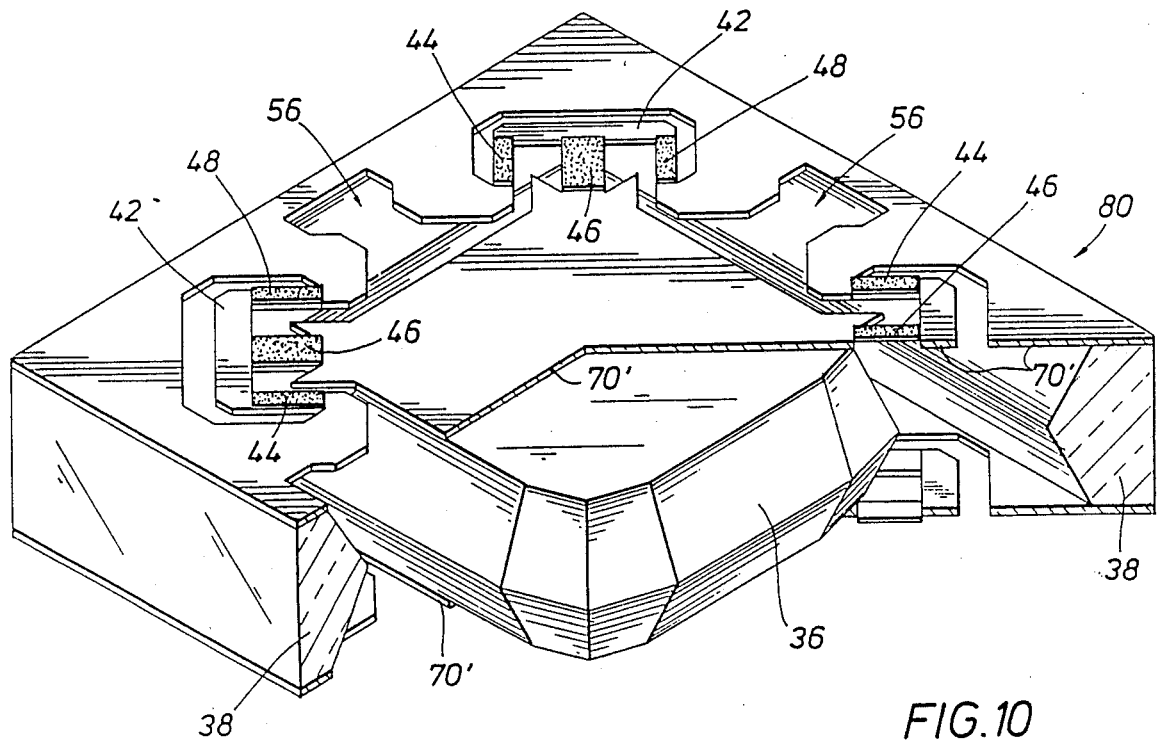
FIG.10

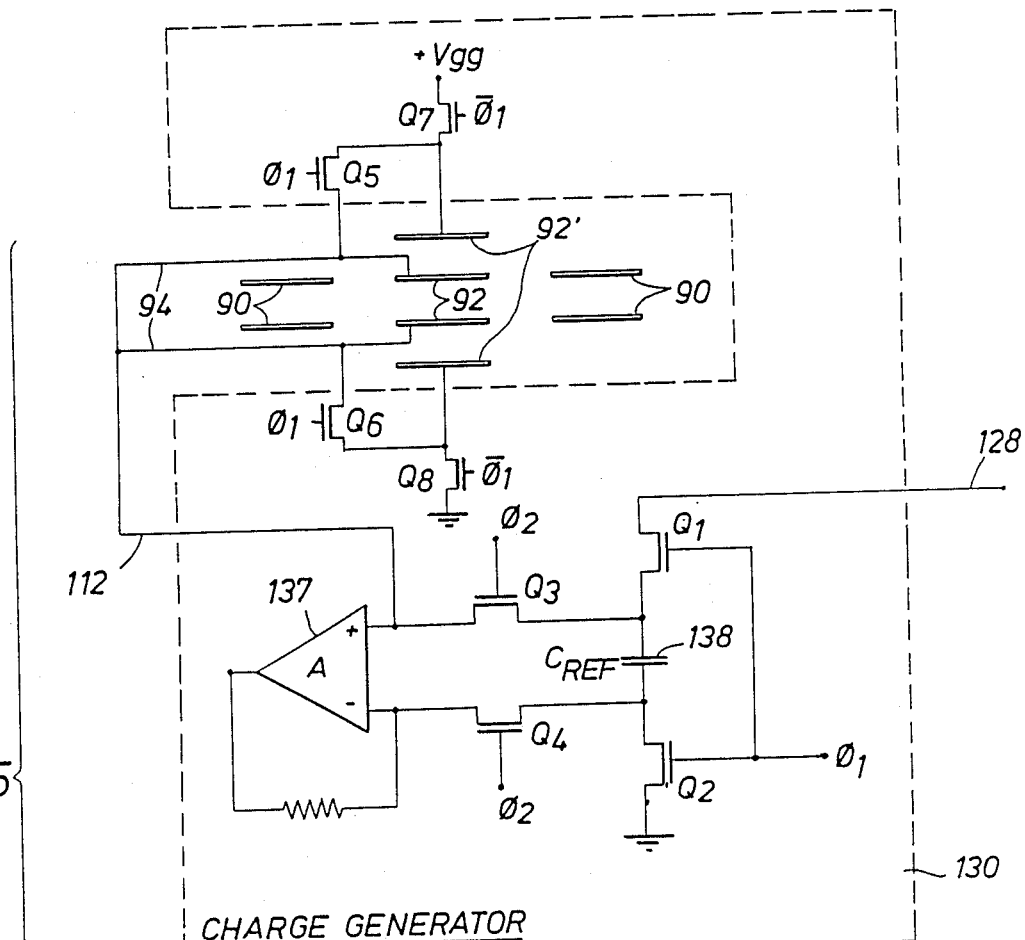
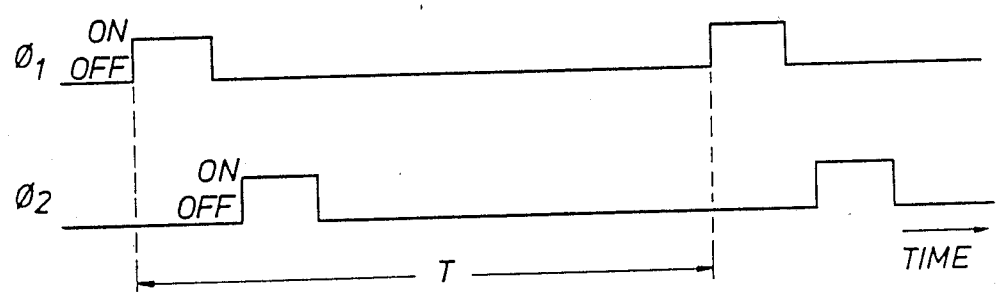
FIG.15

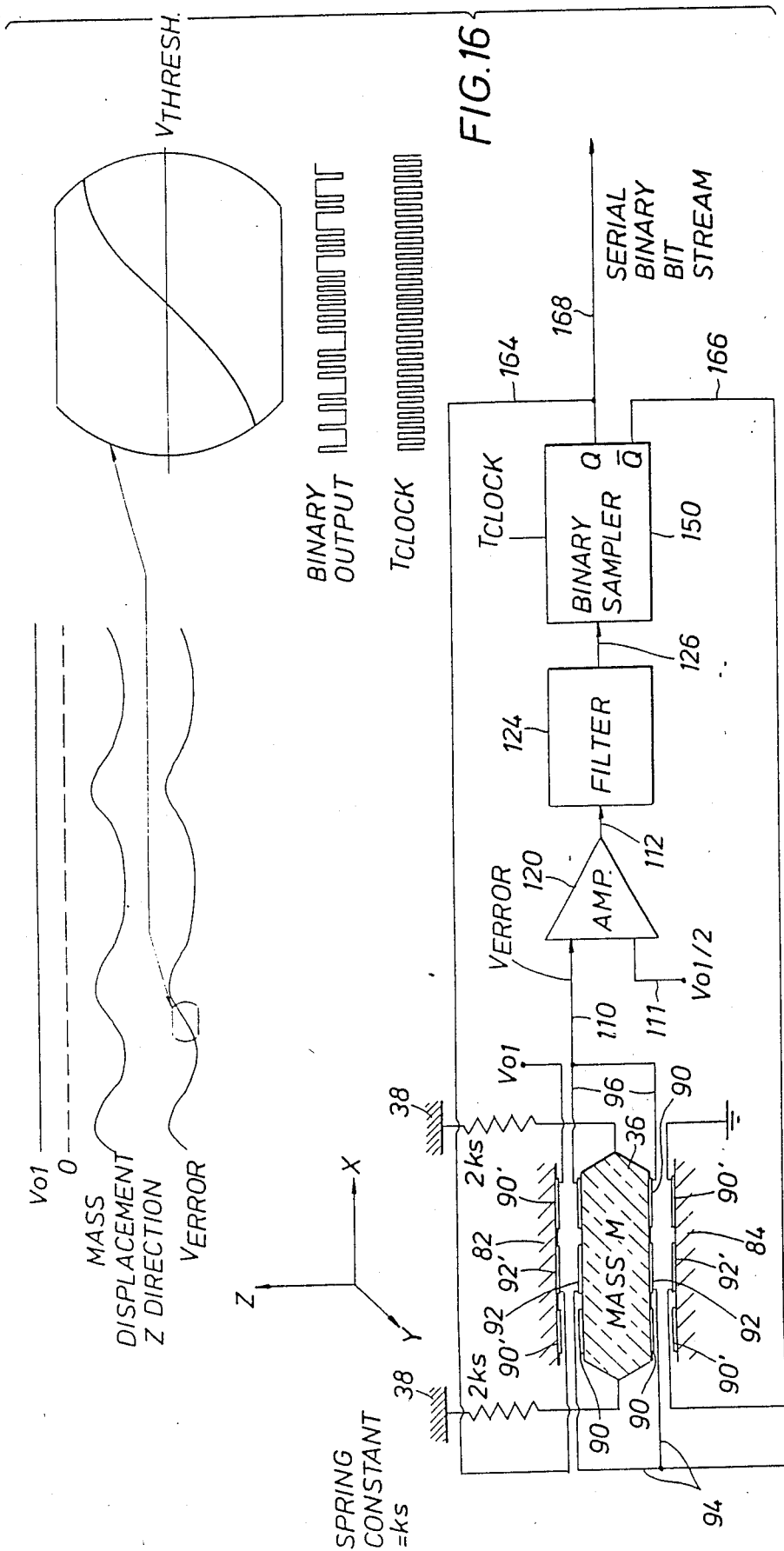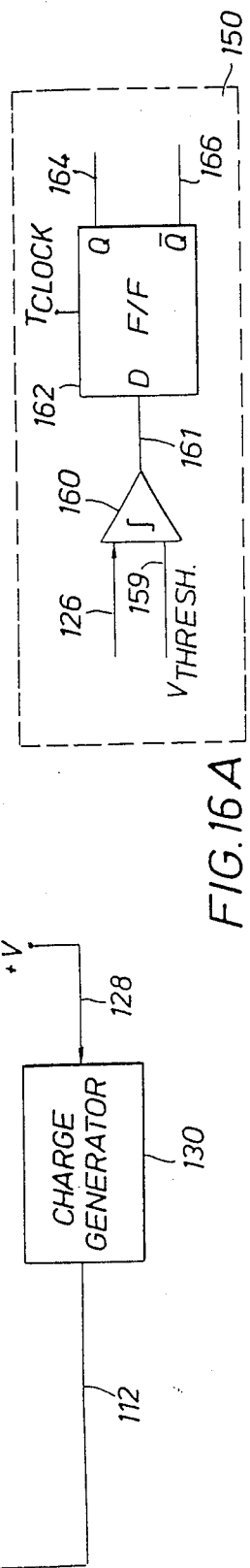
FIG. 16
FIG. 16A

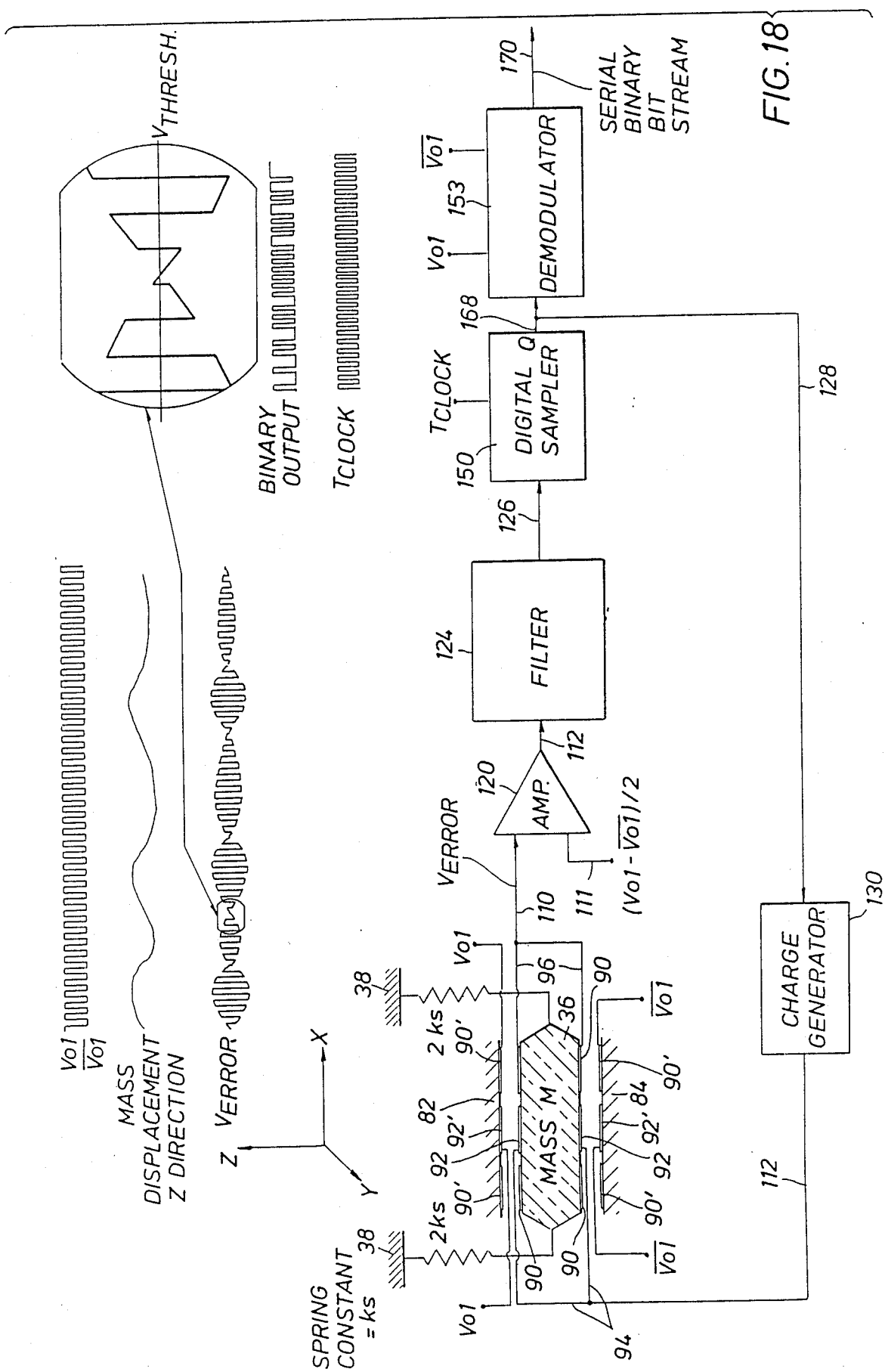

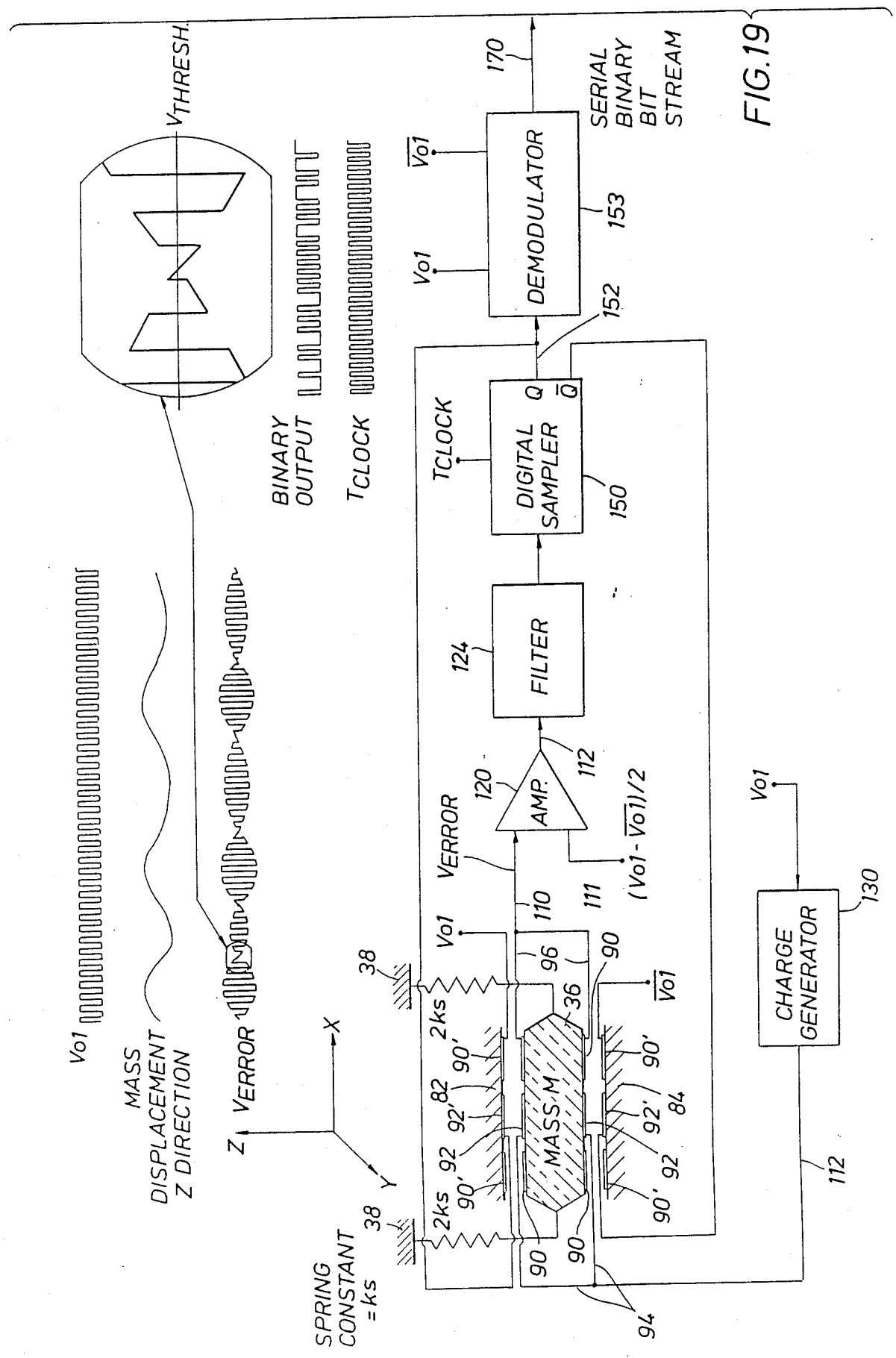

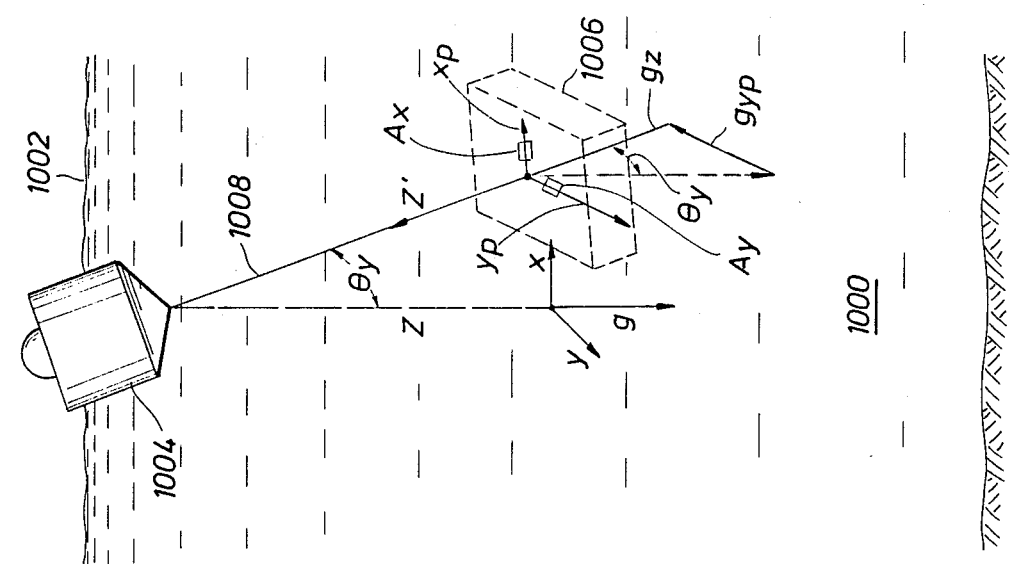
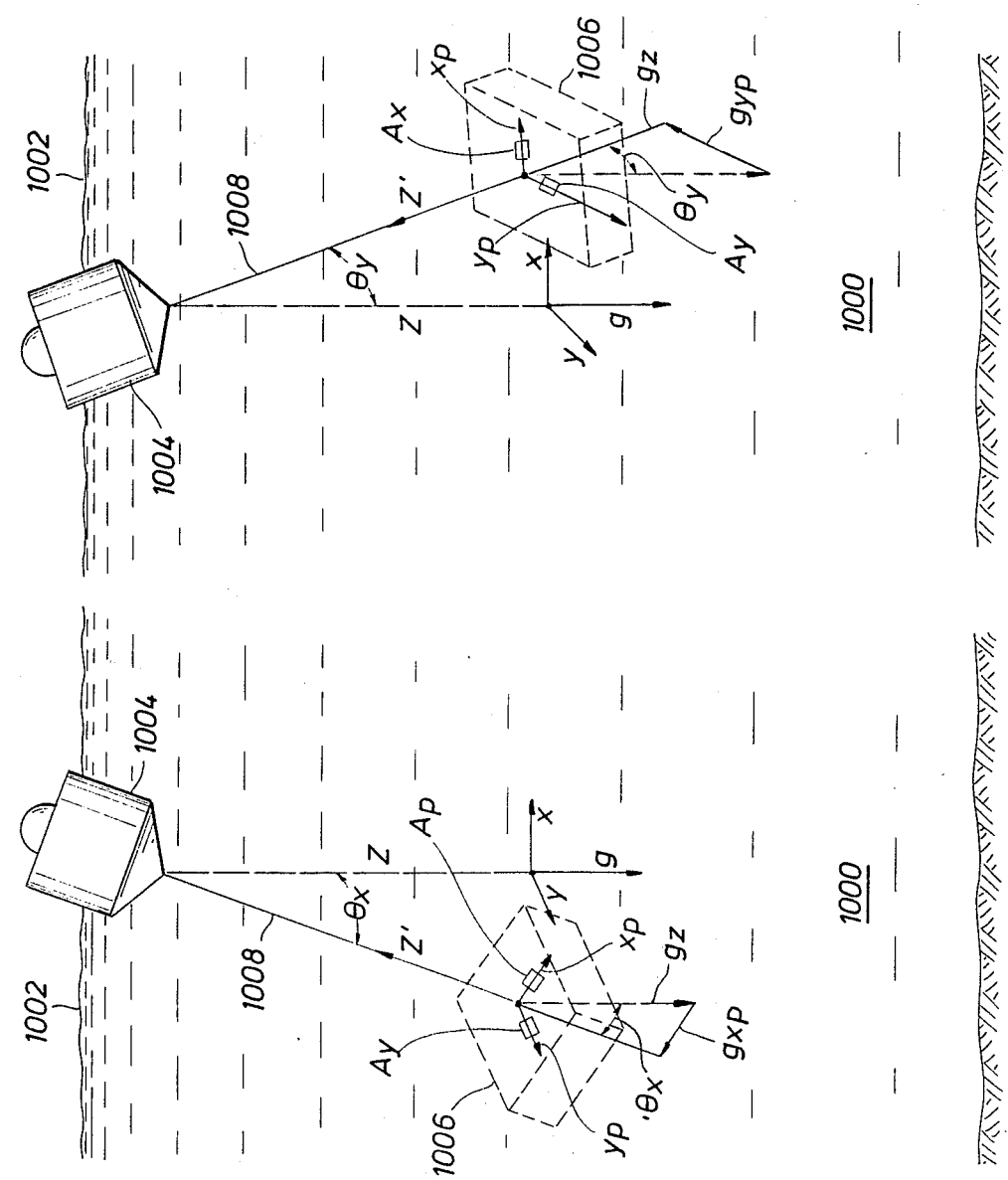
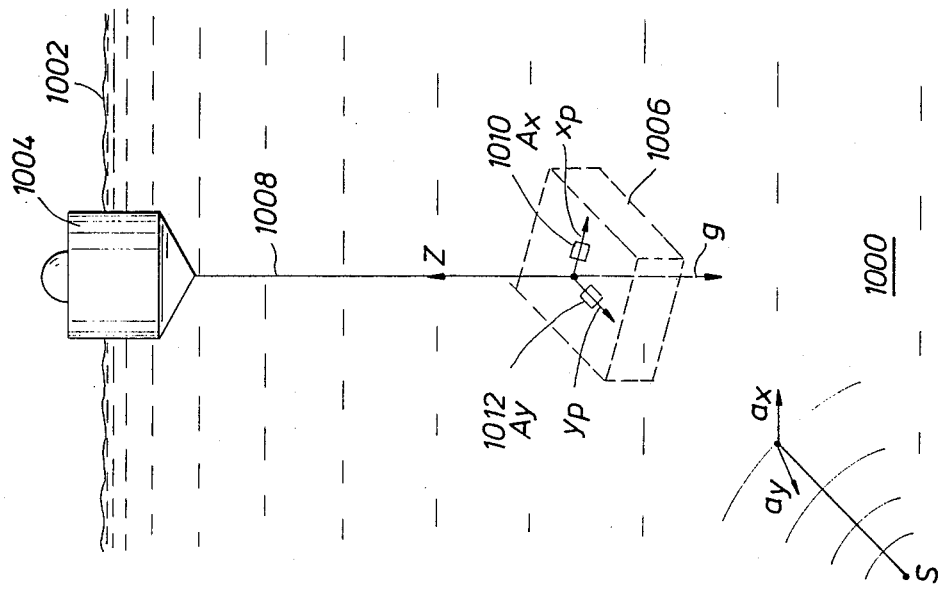

*FIG. 25A*
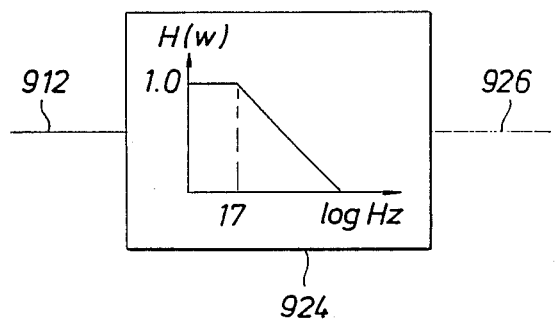
*FIG. 25B*
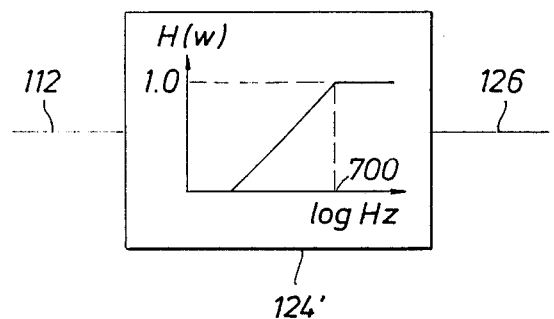
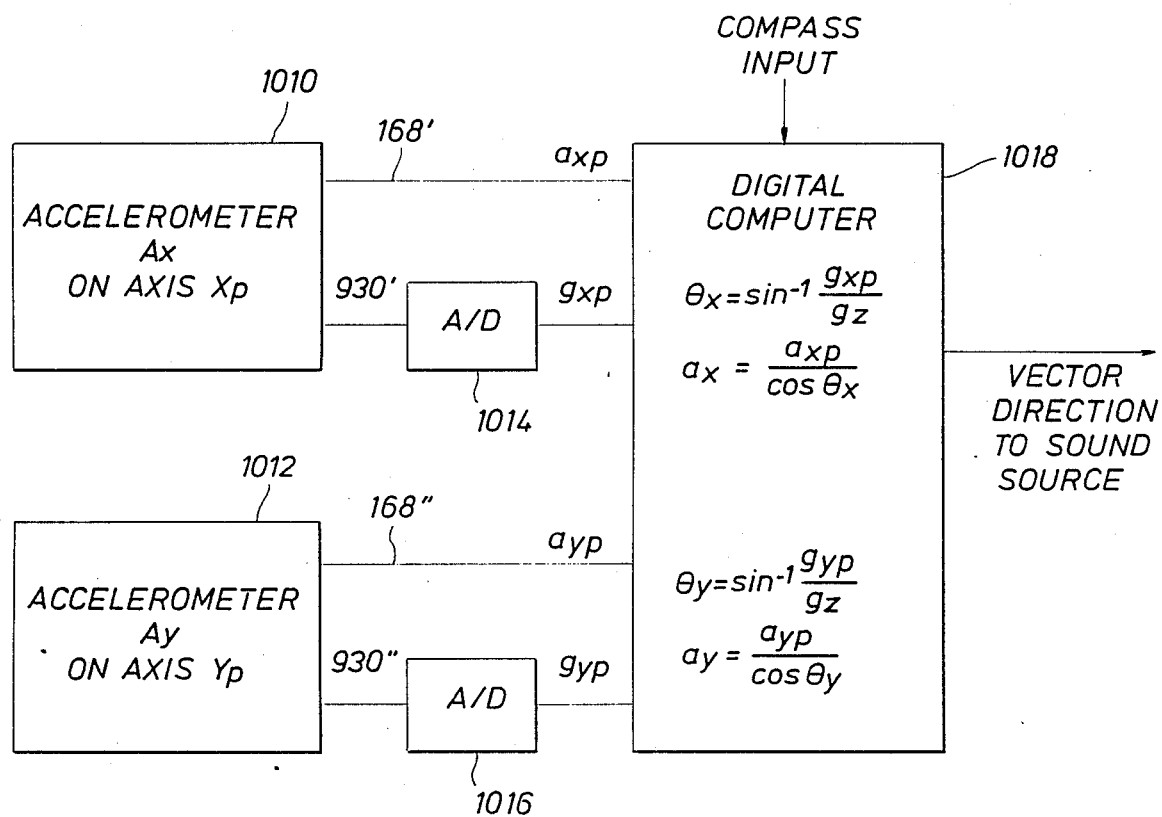
*FIG. 26*

MICRO-MACHINED ACCELEROMETER WITH TILT COMPENSATION

CROSS-REFERENCE TO RELATED APPLICATION

This application is a Continuation-In-Part of a copending application U.S. Ser. No. 209,415 filed June 20, 1988.

BACKGROUND OF THE INVENTION

1. Field of the Invention

This invention relates generally to transducers which may be fabricated from semi-conductor material such as silicon by batch photolithographic techniques from a monocrystalline wafer. More particularly, the invention relates to a spring-mass-support structure for detecting a signal proportional to acceleration applied to the support structure. The invention also relates to electronic circuitry in combination with the structure for detecting displacement of the spring supported mass to produce analog or binary representations of acceleration applied to the support structure.

2. Description of the Prior Art

A publication by Kurt E. Petersen entitled "Silicon as a Mechanical Material" published in Vol. 70, No. 5 (May, 1982) of the Proceedings of the IEEE, surveys the art of micro-machining of silicon to fabricate a mechanical device. The Petersen publication describes etching techniques commonly used in fabricating micromechanical devices and describes several devices which have been made using such techniques. The publication also describes a cantilever beam light modulator array the beams of which are fabricated of silicon dioxide. Another survey article appeared in the April, 1983 publication of Scientific American entitled "Silicon Micromechanical Devices" by Angell, et al.

An accelerometer having a micromachined cantilever beam intended for in vivo biomedial studies and which includes a piezoresistive sensing element is described in a publication entitled "A Batch-Fabricated Silicon Accelerometer" by Roylance and Angell in IEEE Transactions on Electron Devices, Vol. ED-26, No. 12, December, 1979.

U.S. Pat. No. Re. 31,459 (reissue of U.S. Pat. No. 4,071,838) reissued Dec. 6, 1983 in the name of Barry Block discloses a silicon folded leaf spring force transducer fabricated by batch photolithographic and etching techniques. One embodiment of such transducer consists of four E-springs located at 90° angles about the central axis of sensitivity. Piezoresistors disposed on legs of the E-springs provide a measure of the displacement of the springs in response to a force applied to the transducer.

U.S. Pat. No. 4,155,516 issued Mar. 13, 1979, in the name of Harry Aine discloses first and second leaf spring structures, as supported from support structures, which are coupled together in axially spaced mutually opposed relation so that the first and second leaf spring structures are coupled together for deflection in unison relative to the surrounding support structures in response to deflection of either of the first and second spring structures. A capacitive detector structure is provided for detecting displacement of the leaf spring.

U.S. Pat. No. 4,597,003 issued June 24, 1986, in the names of Aine and Block discloses a method of chemical etching a silicon wafer by undercutting an etch stopped layer to fabricate a cantilever beam supported at one end by a frame structure with an integral mass formed by the etch. Etching from opposite etch stopped layers of a silicon wafer is described.

While the art described above has advanced the art of micro-machining of silicon wafers to fabricate sensors in general and accelerometers in particular, there remains a need for a micro-machined structure of silicon and other materials and associated electronics meeting extremely precise specifications. For example, extremely low distortion for an accelerometer is required for certain applications. Prior art spring configurations and materials are believed to produce spring constants which change unacceptably over a deflection range of interest. Very low sensitivity to accelerations orthogonal to the sensitivity axis is desired. Prior art spring mass configurations do not provide sufficient insensitivity to orthogonal acceleration and angular motion applied to such configurations. Very high dynamic range (requiring extremely low noise) is desired in an accelerometer which has not been provided by prior art accelerometers and associated detecting electronics systems. Shock impact insensitivity is required in an accelerometer intended for use in certain applications such as in the seismic, automotive, or aeronautics fields.

IDENTIFICATION OF OBJECTS OF THE INVENTION

Accordingly, it is a primary object of the invention to provide a micro-machined spring-mass sensor which has springs having spring constants which can be precisely controlled during the fabrication process.

It is another object of the invention to provide a geometry of a spring-mass-support transducing element which results in an accelerometer which has very low distortion and has a very low sensitivity to motion orthogonal to its sensitivity axis and to angular motion.

It is still another object of the invention to provide an accelerometer sensor which when subjected to extremely high shock impacts will survive undamaged.

Another object of the invention is to provide a micromachined sensing device and associated electronics resulting in an accelerometer with an extremely broad dynamic range.

Another object of the invention is to provide a batch fabricated micro-machined sensing element with associated electronics for producing a signal representative of acceleration applied along the sensitivity axis of the element.

Another object of the invention is to provide a batch fabricated micro-machined sensing element with associated electronics to produce a binary bit stream representation of acceleration applied along the sensitivity axis of the element.

Another object of the invention is to provide a batch fabricated micro-machined sensing element with associated electronics by which accelerations of low frequency and high frequency may be determined in separate feedback loops effectively allowing large slowly varying accelerations to be measured simultaneously with smaller higher frequency accelerations thereby decreasing dynamic range requirements of the sensor in the measurement of such higher frequency accelerations.

SUMMARY

The objects identified above as well as other features and advantages of the invention are incorporated in a device including a mass-spring-support sensing structure and associated electronics. The sensing structure includes a micro-machined transducer having a support frame and a sensing mass supported from the frame by at least one, preferably eight, E-shaped leaf springs. Each of the eight E-springs have a base with two outer legs and an inner leg. Each leg is connected to the base at one of its ends. The two outer legs connect to the frame at their other ends. The inner leg is connected to the mass at its other end. The base is characterized by a coefficient of stiffness substantially greater than that of the legs. Each of the legs are preferably the same length. In order to precisely define the spring constant of the springs, the legs are fabricated of silicon dioxide, because the thickness of the silicon dioxide springs may be precisely controlled during the fabrication process.

The mass-spring-support sensing structure is fabricated by orienting four E-shaped leaf spring structure patterns on top and bottom (100) faces of a silicon wafer such that they are oriented at forty-five degree angles with respect to intersection lines of (111) planes of the wafer and the opposite faces of the wafer. The opposite faces are masked and silicon dioxide grown on surfaces which will ultimately be etched away by an etching chemical A thin layer which is a stop layer is formed. This layer can be formed by diffusing into this layer an impurity, such as arsenic, that will change the semiconductor type from P to N in this layer for an impurity such as arsenic which will form a P/N junction between the layer and the substrate. A voltage bias can then be applied to this layer to form an electromechanical etch stop layer. The arsenic is diffused into opposite surfaces of the wafer everywhere except the "opening" surfaces and the surfaces which will ultimately serve as the legs of the spring.

A thick oxide layer is then grown by diffusing a precise amount of oxygen into the silicon to form a precise thickness of silicon dioxide on the silicon wafer. Next, the opposite surfaces of the wafer are masked exposing only the regions which will not be the springs of the structure as well as some other selected areas. These exposed areas of silicon dioxide are then etched down to the silicon surfaces. A thin silicon dioxide layer is then grown, masked, and the exposed silicon dioxide etched down to the silicon surface in the regions that will be exposed to the silicon etchant. Chemical etch of the silicon material then is applied which acts through the openings of the silicon dioxide to etch silicon material away while undercutting the springs, leaving a central mass supported by silicon dioxide spring legs. Stiff etched-stop layers remain for the bases of the springs and the opposite faces of the suspended mass and support structures.

Force and sense conducting areas are then deposited on opposite faces of the suspended mass. Conductors are deposited which run from the conducting areas via spring legs to the support structure. First and second plates having corresponding force and sense plates with conductors running to external connecting pads are fixed to opposite support surfaces of the mass-spring-support structure such that each of the conducting surfaces of the mass precisely face a corresponding conducting surface of the first and second plates.

An electrostatic electronic feedback system is provided to detect displacement of the mass of the mass-spring-support structure in response to acceleration or force applied to the support. For frequencies of the applied acceleration below the resonant frequency of the mass-spring-support structure, displacement of the mass is proportional to acceleration. Displacement of the mass (and consequently the acceleration) applied to the support structure is measured by applying a first voltage between the sense conducting areas of the opposite plates and applying a second voltage between the force conducting areas of the opposite plates. The first voltage creates a sense electric field between the sense conducting areas of the suspended mass and induces a sense voltage on it proportional to the displacement of the mass between the opposite plates. The second voltage creates a force electric field between the force conducting areas of the mass.

A forward circuit responsive to the sense voltage generates a displacement signal which is representative of the displacement that the mass has moved from a reference position between the plates. A feedback circuit responsive to the displacement signal applies an amount of electric charge on the force conducting area of the mass surface such that a force is created on the mass proportional to the product of the amount of charge and the force electric field so as to substantially restore the mass to the reference position. The displacement signal is an analog representation of acceleration. The first and second voltages may be d.c. voltages, or may be square waves operating at a modulation frequency higher than expected frequencies of the acceleration to be measured. A demodulator is required to produce an unmodulated analog output signal representative of acceleration.

Another embodiment of the invention, like the ones described above, includes a sensor for generating a displacement signal representative of displacement of a mass from a reference position with respect to a support structure. A forward circuit is provided which, in response to the displacement signal, converts the displacement signal to an output binary stream. A feedback circuit, in response to such output binary stream, generates a binary force on the mass in a direction tending to restore the mass to the reference position. Consequently, the output binary stream is representative of a characteristic of motion, preferably acceleration, of the support structure.

An alternative embodiment of the sensor and accelerometer is provided for an application where the accelerometer is placed on a platform subject to tilt. Tilt of such platform causes a potentially large slowly varying gravitational acceleration to be coaxial with small higher frequency accelerations desired to be measured. The sensor is provided with additional "gimbal force" plates in addition to the force plates of the sensor described above. Separate electronic feedback circuits, one including a low pass filter, the other including a high pass filter, are provided by which a displacement signal of the mass of the spring-mass-support system is sensed and fed back in two paths to null the mass in the face of accelerations applied to the support.

In one arrangement, a low frequency analog signal is applied to mass gimbal force plates while a constant charge is applied to opposing corresponding support plates. A high frequency binary bit stream signal is applied to mass force plates while a constant charge is applied to opposing corresponding support plates. The low frequency analog signal is representative of tilt-induced gravitational acceleration. The high frequency binary bit stream is representative of the higher frequency acceleration of a signal the detection of which is sought.

In another arrangement, the low frequency analog signal is applied to mass gimbal force plates while a constant charge is applied to opposing corresponding support plates. A high frequency binary bit stream is applied to a charge generator to produce a corresponding charge signal which is applied to mass force plates. A constant voltage is applied across opposing corresponding support plates.

Apparatus is also provided for translating the high frequency signal representation of acceleration to an untilted orientation by using the low frequency representation of tilt-induced gravitational acceleration.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which:

FIGS. 5A and 5B are similar to FIGS. 4A and 4B but show a wafer portion after it has been masked with a pattern of a spring-mass-support structure, and after portions of the oxide layers have been removed, leaving a pattern of oxide partially defining ultimate etching openings on the opposite sides of the wafer;

FIGS. 6A and 6B are similar to FIGS. 5A and 5B but reflect further processing after etch stop material has been diffused into the crystal of the wafer on opposite surfaces in areas other than the etching openings and spring legs;

FIG. 9A shows a plan view of the one-half of the wafer after chemical etching of the wafer through etch openings has etched to (111) planes of the crystal of the wafer thereby undercutting the E-spring structures and severing the mass portion of the structure from the support portion while suspending the mass from the support and after further processing where the thin layer of etch stop material beneath oxide sides of the springs have been removed;

FIG. 9B is a sectional view of the wafer illustrated in FIG. 9A taken along section lines 9B—9B;

FIG. 10 is a perspective view of the sensing element structure including support, E-springs and sensing mass, the view being partially cut-away to illustrate the central mass severed from the support structure to show the oxide springs and undercut etch stop layers of the mass, springs and support structure;

FIG. 15 is a schematic illustration of a charge generator circuit used directly or with modification in the transducer systems of FIGS. 13, 14 and 16, 17, 18 and 19;

FIG. 16 is a schematic illustration of a transducer having a binary bit stream output representative of the displacement or acceleration of a mass in a mass-spring-support structure with binary bit stream voltages applied to top and bottom force plates and with a constant charge applied to force plates of the mass with the result that a binary force is applied to the mass tending to restore it to its reference position;

FIG. 16A is an illustration of a binary sampler used in the embodiments of FIGS. 16, 17, 18 and 19;

FIG. 18 is similar to the transducer of FIG. 17 except that an electric field applied to the force plates of the top and bottom plates is modulated with an a.c. signal, and consequently the binary bit stream of charge applied to the force plates of the mass is also modulated;

FIG. 19 is similar to the transducer of FIG. 18 except that the charge applied to the force plates of the mass is modulated and modulated bit streams of the output signal are fed back to the force plates of the top and bottom plates;

FIGS. 20A–20C illustrate an application of the transducer of the invention used to measure acceleration on a submerged platform subject to tilt caused by wave and current action of the water;

FIGS. 25A and 25B are schematic diagrams showing the frequency characteristics of a low pass filter and a high pass filter used in the embodiments of the accelerometers of FIGS. 23 and 24; and FIG. 26 is a block diagram of a digital computer used in conjunction with x and y accelerometers mounted on a submerged platform, such diagram illustrating computations for correcting measured accelerations for the effect of tilt of the platform in the water.

DESCRIPTION OF THE INVENTION

Two important motivating factors, among others, led to the accelerometer of this invention. The first is low manufacturing cost so that the resulting accelerometer may find wide application where many force sensing transducers are required. The second is an accelerometer having extremely high performance characteristics: wide dynamic range; low distortion; low sensitivity to motion orthogonal its sensitivity axis; and resistance to high shock impact. These requirements lead to the fabrication of the accelerometer by micro-machining techniques from a monocrystalline material such as silicon.

Figure 1:
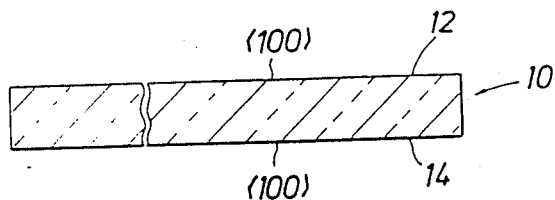
FIG. 1 is a transverse sectional view of a wafer of monocrystalline material from which a spring mass system is to be fabricated according to micro-machining techniques of the invention.

Referring now to FIG. 1, a typical wafer 10 is shown from which a batch of accelerometers are to be fabricated according to the process of the invention. In a typical example, the wafer 10 is made of a nonmetallic monocrystalline material such as silicon, germanium, quartz, gallium arsenide, gallium phosphide, etc. In a preferred embodiment, the wafer 10 is made of a diamond cubic material, such as silicon. The wafer 10 has a thickness of about 500 microns, has polished top and bottom surfaces 12, 14 and has a convenient diameter, such as 3 to 8 inches. In the case of diamond cubic material, the crystallographic plane (100) is preferably formed at the upper 12 and lower 14 major surfaces of the wafer 10. Furthermore, the wafer 10, in the case of silicon, is preferably doped with a P type dopant to a conductivity of between 0.1-10.0 ohm-cm.

Figure 2:
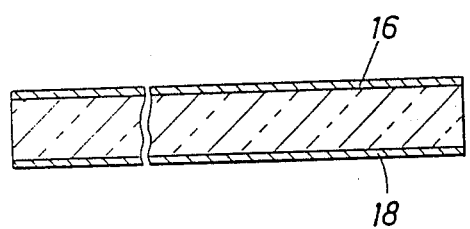
FIG. 2 is a view similar to that of FIG. 1 showing an oxide layer formed on opposite sides of the wafer.

In the next step of the process, the wafer 10 is oxidized on opposite sides to form oxidized layers 16, 18 of 2500 angstroms in thickness as illustrated in FIG. 2. This is conveniently achieved by putting the wafers in a furnace at 1100° C., in the presence of oxygen. Next, the oxide layers 16, 18 are each coated with a photoresist material such as KMER.

Figure 3:
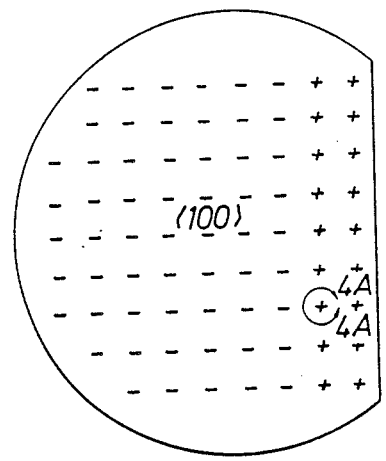
FIG. 3 is a plan view of the wafer of FIG. 2 showing areas for which spring-mass-structures will be fabricated.
Figure 4A:
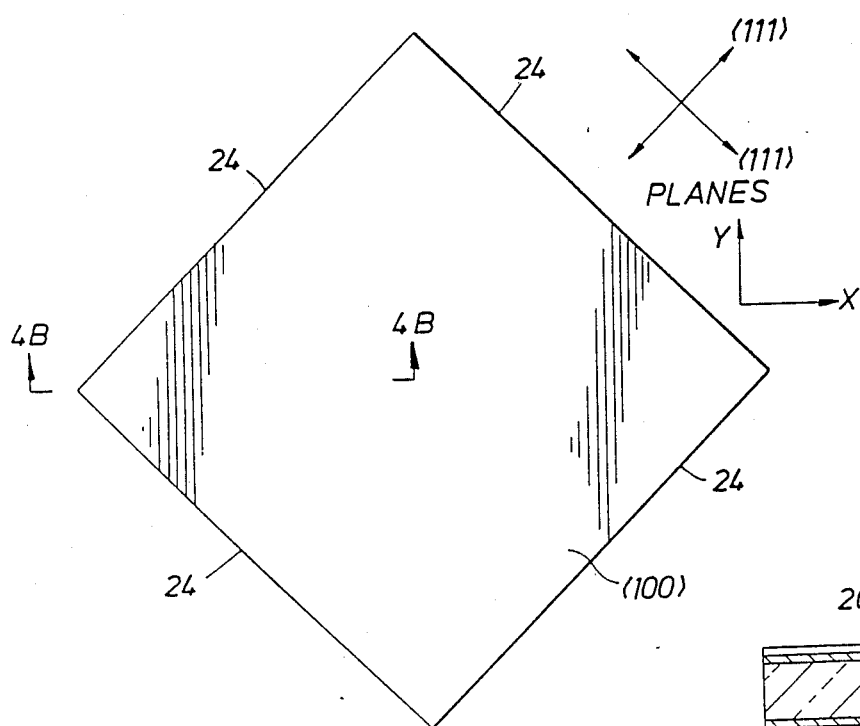
FIG. 4A is an enlarged view of an area of FIG. 3 as indicated by line 4A of FIG. 3 which indicates the orientation of the crystal top and bottom surfaces and its relation to (111) planes of the crystal.
Figure 4B:
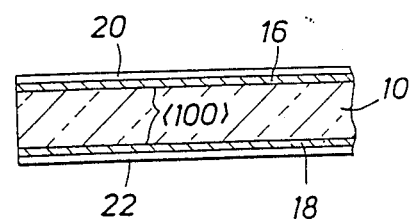
FIG. 4B is a sectional view of the wafer showing a part of the layout taken along the lines 4B—4B of FIG. 4A with photo-resist material having been applied to the opposite sides of the wafer.

FIG. 3 is a plan view of the wafer with multiple areas each of which are to be processed simultaneously to batch produce the mass-spring-support structures of the invention. One particular area is illustrated in FIG. 3 with line 4A—4A, shown much enlarged in FIG. 4A. The boundary edges 24 of the structure to be fabricated are oriented parallel to the (111) planes of the crystal as illustrated in FIG. 4A. Each structure of the array of structures of FIG. 3 will ultimately be cut along the boundary edges 24 parallel to the (111) planes of the crystal after batch processing. FIG. 4B shows a cross-section through a portion of the wafer showing the KMER photoresist layers 20, 22 deposited over silicon dioxide layers 16, 18.

FIG. 5A shows one side of the wafer (for convenience called here the top side) after masking and exposure of the pattern as depicted thereon. The unexposed photoresist portion covers the etch opening patterns 30' and the spring legs 30", but the remainder of the photoresist portions are removed by exposure and development of the photoresist. The wafer is then placed in a silicon oxide etch solution such as buffered hydrofluoric acid, which attacks the oxide but not the photoresist or the underlying silicon. The photoresist protects the pattern 30 as illustrated in FIG. 5A. The pattern 30 includes two parts: the regions indicated by 30' will ultimately be etch openings; the regions marked 30" will ultimately be spring legs. FIG. 5B shows a cross-section through lines 5B—5B of FIG. 5A and illustrates the oxide portions 30' and 30" on top and bottom surfaces 12, 14 which respectively ultimately form a slot opening behind the base of the E-spring and the middle leg of the E-spring. Oxide portions 30' and 30" are greatly enlarged in FIG. 5B for ease of illustration.

The oxide pattern 30' of FIGS. 5A and 5B will ultimately serve as the etch openings to fabricate the three dimensional mass-spring-support structure of the accelerometer. The oxide patterns of 30" will ultimately be the location of the spring legs of the E-springs. A perspective view of the structure may be seen in cut-away sectional view of FIG. 10 showing the structure at a certain stage in the processing.

FIG. 5A illustrates particular features of the grown oxide patterns 30' and 30" which ultimately will result in the structure of FIG. 10. The lines 32—32 of FIG. 5B show a region in which an "E"-shaped spring 40 will be fabricated to partially support a mass 36 from a surrounding support structure 38. The E-spring 40 will include a base 42 and three legs 44, 46, 48. Slots or openings 43, 45, 47 will ultimately outline the shape of the E-spring. The inner leg 46 is twice the width of outer legs 44, 48. The lengths of the legs 44, 46, 48 are precisely the same.

Each E-shaped spring 40 is placed at the corner of intersecting (111) planes, that is, at 45° angles to intersecting lines of (111) planes which intersect the surfaces 12, 14 of the mono-crystalline wafer 10. The base 42 of each spring will ultimately be fabricated of stiff etch stop material while each leg 44, 46, 48 will ultimately be fabricated of silicon dioxide, as described below in more detail.

Two characteristics of the shape of the pattern of lines 32—32 are important. The first relates to the area identified by arrow 50, which connects the inner leg 46 to the sensing mass 36. Solely for purposes of illustration and description, this region is called the "cat head with ears" region, and is pointed to by reference arrow 50. The top of the cat head is attached to inner leg 46 with its "neck" or "body" attached to mass region 36. The "ears" of the cat head and ears region extend into oxide areas which ultimately will be openings between sensing mass region 36 and support region 38. The cat head and ears geometry provides a stiff region of mass 36, ultimately to be fabricated of undercut etch-stop material, to which inner leg 46 is connected.

The second shape relates to an area pointed to by reference arrow 52 of FIG. 5A. Solely for purposes of illustration and designation, this region is called the "hockey stick" region because of its general resemblance to the shape of a hockey stick. This hockey stick region, ultimately to be undercut etch stopped material between regions 43 and 56 (which ultimately will be openings formed by means of silicon etching), provides a relatively wide region at the top of the foot of the hockey stick by which outer leg 44 (or 48) attaches to etch stopped material. Such wide region provides a strong connection between the ends of the outer legs of the E-springs and the etch stopped material of the surrounding support structure.

The oxide areas 56 (which ultimately will be openings) have edges 58, 60 which are coexistent with intersecting lines of (111) planes of the crystal with the (100) surface 12 of the wafer. These areas 56 serve as "etch-time and undercut control" areas and are given the short-hand notation, "ETUC" areas. They ultimately serve as large open areas by which etchant chemical will undercut E-springs 40. Their area must be relatively large to allow etchant to etch to intersect (111) planes having intersecting lines 62, 64 with the surface 12. Areas 56 must be large enough to speed the etching process to completion to the intersection of the planes of the intersecting lines 62, 64, but must be shaped as shown to provide the "hockey stick" etch stopped areas 52 on its sides as discussed above. The inner edge 60 defines the intersecting line of a (111) plane of the crystal which will define the outer surfaces of the mass region 36.

Another factor dictating the shape of ETUC areas 56 is the requirement that during chemical etching, the mass region 36 must be severed from the surrounding support frame 38. Chemical etching of the silicon wafer occurs in one direction along (111) planes which intersect with lines such as 64 and 62 of the top and bottom surfaces which are extensions of edges 58 of ETUC areas. Chemical etching of the silicon wafer occurs in the opposite direction along (111) planes which intersect lines which extend from inner edges 60 of the ETUC areas of the top and bottom surfaces. When the etching from the opposite directions along (111) planes meet, the mass 36 is separated from support frame 38 as can be seen in FIG. 9B. Consequently, the distance between edges 58 and 60 must be great enough to allow the mass region 36 to be separated from support frame 36 during chemical etching.

Figure 7A:
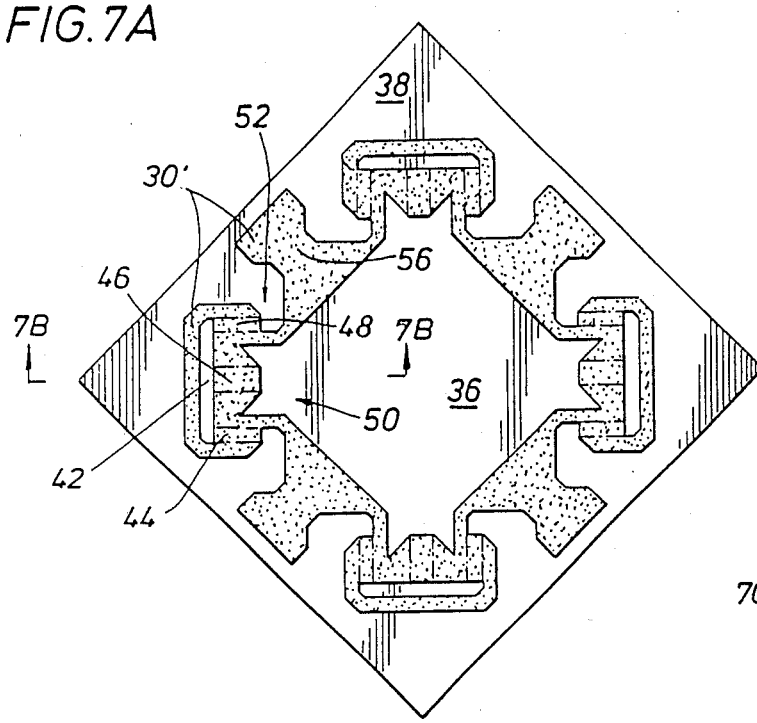
FIGS. 7A and 7B are similar to FIGS. 6A and 6B but reflect further processing after opposite wafer surfaces have been masked to allow further etch stop layer material onto wafer surfaces where surrounding support structure, central mass and bases of E-springs are patterned.
Figure 7B:
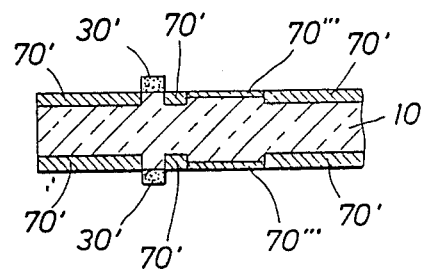

Turning now to FIG. 6A, the silicon dioxide regions 30' defining openings of FIG. 5A and the spring leg regions 30" are masked, and the uncovered silicon portions are implanted with a thin layer of arsenic. The arsenic is diffused a short distance, (6 to 7 microns) in the silicon to form N− layers on top and bottom surfaces that are used as electrochemical etch stop layers in the silicon crystal. This stage of the processing is illustrated in the cross-section of FIG. 6B. Next, the oxide of spring leg region 30" (of legs 44, 46, 48) is removed and an additional two micron thickness of arsenic is diffused into the silicon. FIG. 7B shows this stage of the processing. The thickness of the etch stop layer 70' is now about 8–9 microns thick.

In preferred processing of the mass-spring-support structure of this invention, the thick layer of arsenic is especially important to impart stiffness to certain regions of the top and bottom etch stop layers. The base of the springs 42, cat head region 50 and the hockey stick region 52 require stiffness and strength to connect with the spring legs 44, 46, 48 so that the mass region 36 may be adequately supported from support region 38.

Figure 8A:
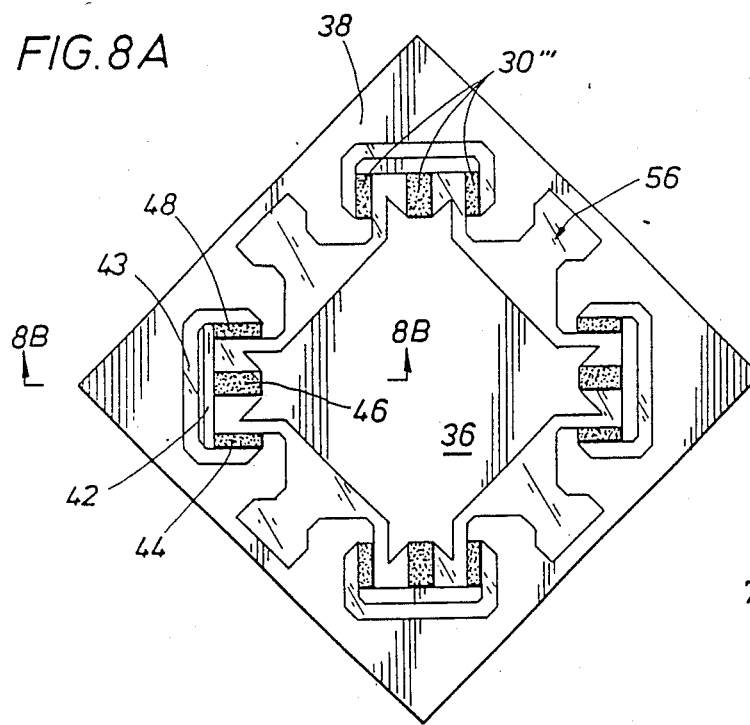
FIGS. 8A and 8B are similar to FIGS. 7A and 7B but reflect further processing after the etching openings on both sides of the wafer have had oxide previously covering them removed and show a relatively thick layer of silicon dioxide material having been grown over areas of the sides of the wafer defining E-spring legs.
Figure 8B:
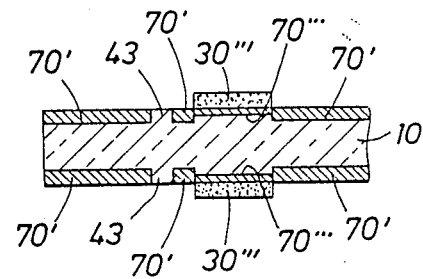
Figure 12:
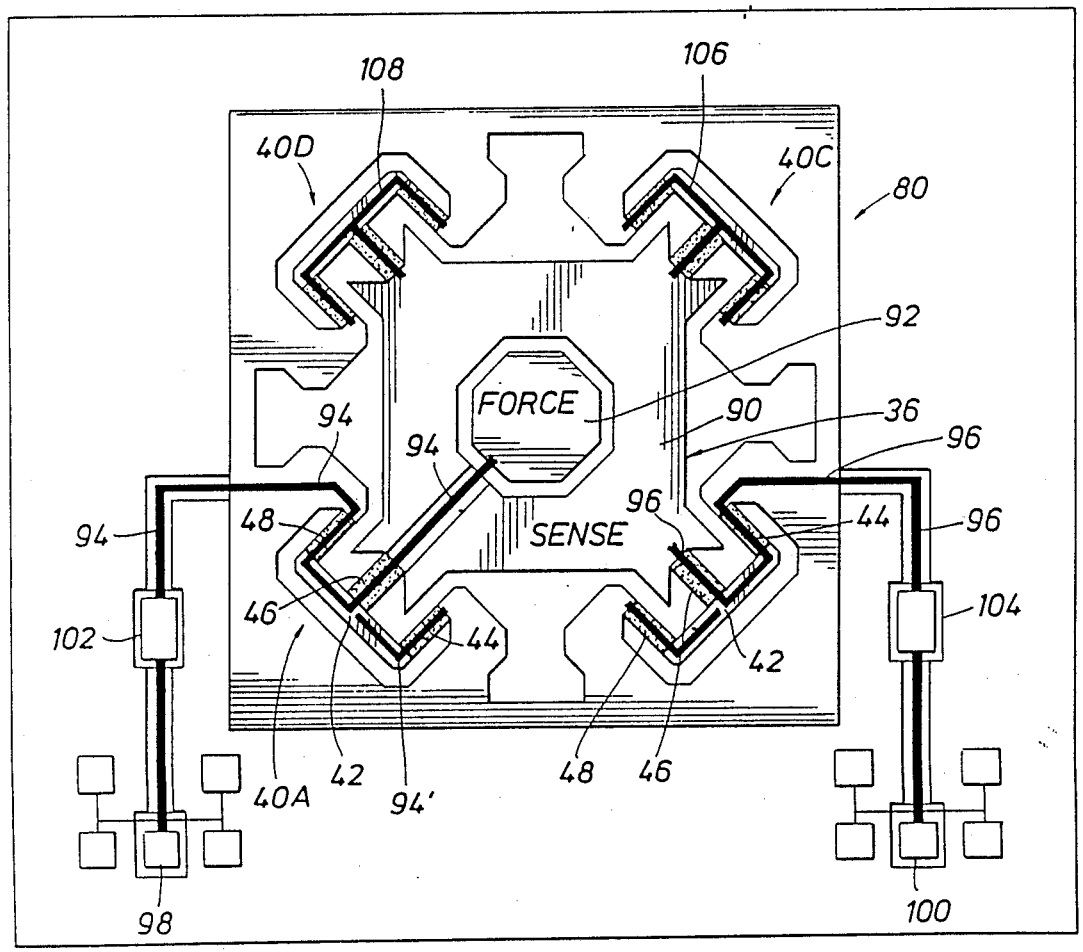
FIG. 12 is a plan view of the sensing structure illustrating deposited conducting leads to the force and sense conducting areas of the mass surface from the support structure via the E-spring leads.

FIGS. 8A and 8B show the condition of the wafer after the silicon dioxide regions 30' have been stripped from the wafer 10, a thick layer (1.2 microns) of silicon dioxide has been regrown everywhere over top and bottom surfaces, and finally such silicon dioxide has been stripped away everywhere except over spring leg portions 44, 46 and 48. Silicon dioxide layer 30''' remains for such legs as is shown in FIG. 8B. At this point in the processing, conductive areas are provided on the opposite faces of the mass region 36 and conductive leads running from the support region via the legs 48 or 44, 46 and base 42 are deposited. For simplification of illustration, the results of providing such conductive region and leads are illustrated in FIG. 12 and described below.

Next, the wafer is subjected to electro-chemical etching such that the wafer is etched away from the ETUC areas 56 and other open areas, such as slots 43. The etch chemical etches beneath etch stop layer 70' preferentially along (111) planes of the crystal of the wafer. The preferred etching process is similar to that described in U.S. Pat. No. 4,597,003, described above and incorporated herein by reference for its electro-chemical etching methods. Next, the thin layers 70''' (FIGS. 7B, 8B) of etch stop material are removed by subjecting the wafer to a silicon etch (either dip or plasma) everywhere. Such etching causes etch stop layer 70' to be reduced in thickness by about 2 microns, that is, to an ultimate thickness of about 6–7 microns.

The result of the processing described above is a three dimensional support-spring-mass structure illustrated in plan and cross-section views of FIGS. 9A and 9B and the perspective view partially broken away of FIG. 10. The etching process has etched the silicon material away, along the (111) planes defined by the intersection of such planes with lines parallel to edges 58, 60 of each of the ETUC areas 56. Undercut etch stop layers 70' are visible in FIGS. 9B and 10 as well as the suspended mass 36, surrounding support structure 38 and silicon dioxide spring layers 30'''. The bases 42 of the E-springs 40 are formed of undercut etch stop material 70' as seen in FIG. 9B and 10.

An important feature of the invention is apparent from FIGS. 9A and 9B. That feature is the fact that bases 42 of the E-springs are fabricated of etch stop material 70' while the legs 44, 46, 48 of the E-springs are substantially entirely of silicon dioxide. This difference in materials allows the stiffness of the base of each E-spring to be substantially greater than that of the legs.

The coefficient of stiffness (Young's modlus) is approximately three times greater for silicon than it is for silicon dioxide. The thickness of the base 42 at each E-spring is controlled during processing to be greater than seven times as thick as that of the silicon dioxide legs. The resulting stiffness of the base, consequently, is seven cubed times three, or more than 1000 times stiffer than the legs for similar lengths and widths of material.

Each spring leg 42, 46, 48 of each E-spring 40 is precisely the same length from its connection at one end of its respective base 42 to its respective connection to either the top of the foot of the hockey stick area or to the head of the "cat head with ears" area. It is fabricated of silicon dioxide, as described above, because the thickness of the silicon dioxide legs may be very accurately controlled. The length of each leg and its thickness must be accurately controlled so as to control the spring constant of the sensing member. It can be shown that the spring constant of the E-spring is proportional to the cube of the thickness of its legs. Another reason for fabricating the legs of each E-spring of silicon dioxide is that silicon dioxide is a well-behaved material in that it has no measurable hysteresis and it does not fatigue over many cycles of flexing.

Legs 44 and 48 are precisely the same width. Leg 46 is made up of one or more side by side legs whose composite width is precisely twice the width of legs 44 or 48. Although not illustrated, leg 46 is preferably a composite of three side by side legs, each leg of course having a smaller width than the composite width. Dividing the total width of leg 46 into three parts has been found to prevent buckling or crinkling of leg 46 after processing.

Figure 11:
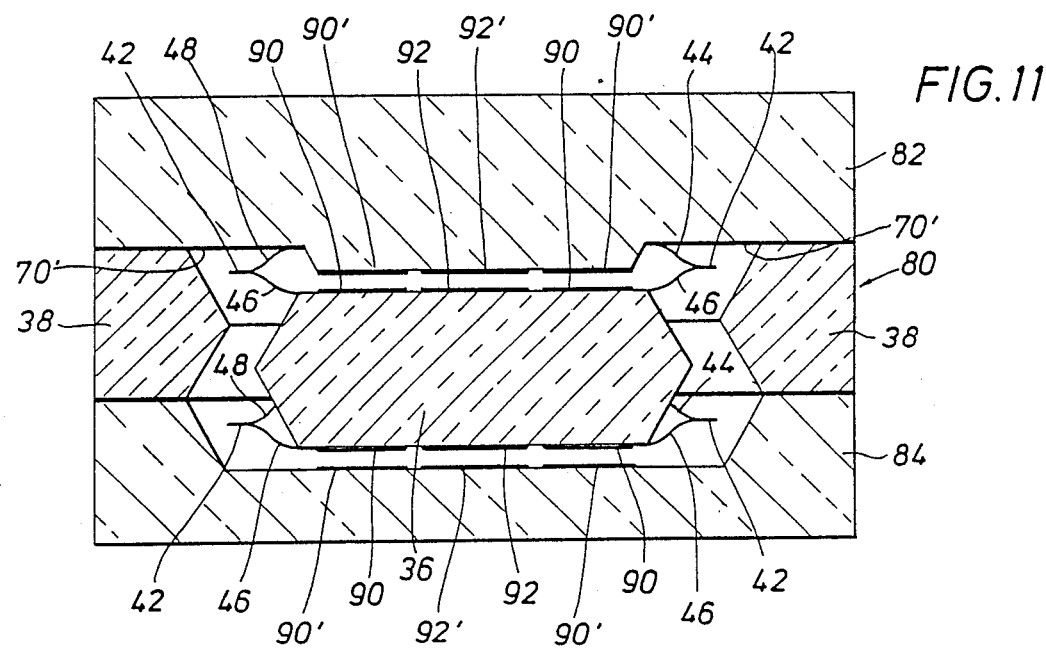
FIG. 11 illustrates a cross-section through the sensing element showing the sensing mass supported by springs to undercut portions of the support member where gravity forces the mass to be disposed beneath the top plane of the support member, the view further showing a composite structure including top and bottom plates having force and sense conducting areas deposited on their faces corresponding to similar force and sense conducting areas on opposite surfaces of the sensing mass.

FIG. 11 shows a cross-section of sensing element 80 sandwiched between opposite supporting members 82, 84. Sensing element 80 shows central mass 36 supported via spring legs 46, 48 and legs 46, 44 via bases 42 from surrounding support member 38. The mass 36 is shown displaced vertically by the force of gravity. The sense conducting areas 90 formed on opposite sides of the faces of mass 36 surround force conducting areas 92. FIG. 12 shows a plan view of the support-spring-mass structure 80 with the force and sense conducting areas 92, 90 formed on the top face of the mass 36. Such areas 90, 92 are conductively isolated from each other. Although not shown in FIG. 12 for simplification of illustration, guard regions are provided between areas 90,92 to reduce the capacitive coupling between such areas. Corresponding force and sense conducting areas 92', 90' are provided on plate surfaces formed on opposite supporting members 82, 84. Such plate surfaces and force and sense conducting areas 92', 90' correspond in size and pattern to the opposite surfaces of mass 36 and its force and sense conducting areas 92, 90. Opposite supporting members are bonded to the support member 38 by conventional means.

FIG. 12 shows conductors running from external connection pads to the force and sense plates. Such conductors are illustrated for one surface of the support-spring-mass structure 80 as an illustration of such conductors provided to the sense and force conducting areas of the top and bottom plates 82, 84 and the opposite surfaces of mass 36. Conductors 94 and 96, preferably gold, are deposited on opposite surfaces of the wafer and structure 80 such that they run respectively from connecting pads 98 and 100 via separate E-springs 40A and 40B. As illustrated, lead 94 connects to force conducting area 92 via legs 48 and 46 and base 42 of E-spring 40A, while lead 96 connects to sense conducting area 90 via legs 44 and 46 and base 42 of E-spring 40B.

The leads 94 and 96 respectively pass through tunnels 102, 104 provided for a seal (not shown) between sandwiched surfaces of support member 38 and opposite supporting members 82, 84. Conductor 94' is deposited on opposite leg 44 and a portion of base 42 of spring 40A to balance the weight and stiffness of conductor 94 on leg 48 and base 42. Likewise, conductor 96' is deposited on opposite leg 48 and a portion of base 42 of spring 40B to balance the weight and stiffness of conductor 96 or leg 44 and base 42. Conductor 94' is not electrically connected to conductor 94. Likewise, conductor 96' is not electrically connected to conductor 96.

Conductors 106 and 108 are deposited on E-springs 40C and 40D, but have no external electrical connection. Such conductors 106 and 108 provide weight and stiffness to springs 40D and 40C to balance the weight and stiffness of conductors deposited on springs 40A and 40B. Each of the four surfaces, two opposite faces of mass 36 and opposing surfaces of opposite support members 82 and 84, have similar conducting leads attached to their respective force and sense conducting areas. Such leads are connected to appropriate pads illustrated adjacent pads 98,100 of FIG. 12 which communicate with electronic circuitry described below.

Figure 13:
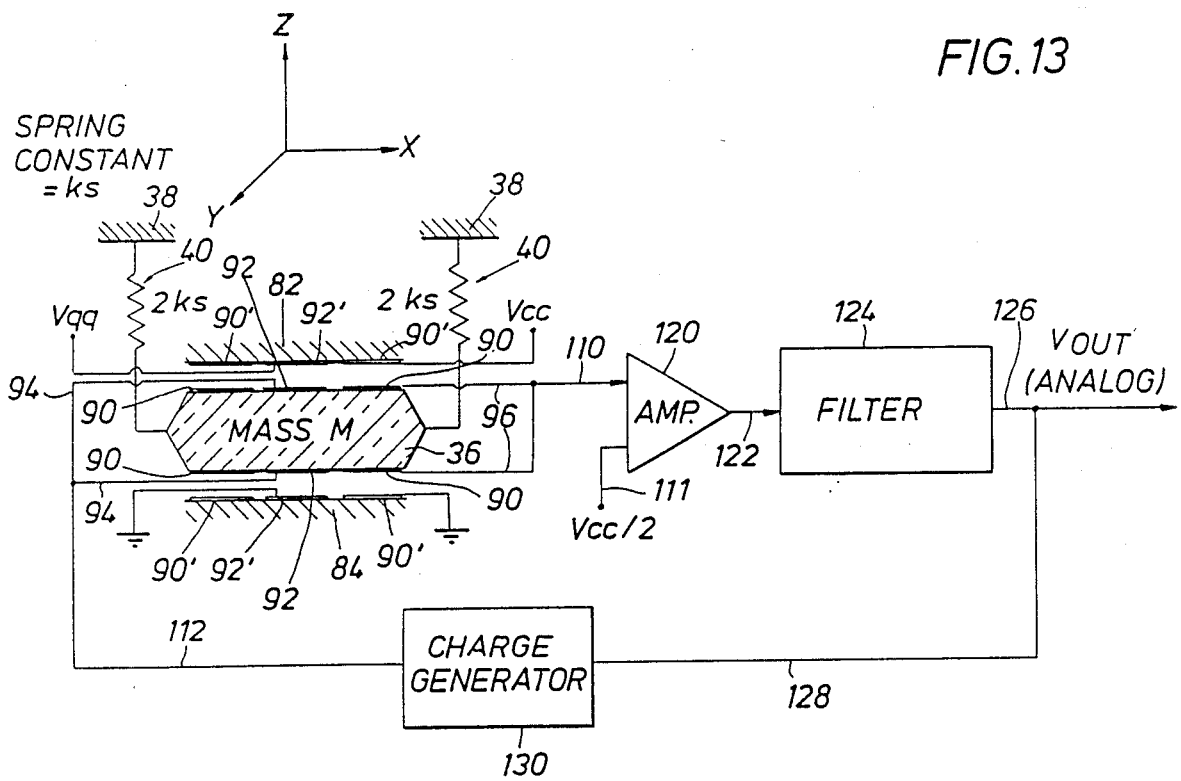
FIG. 13 is a schematic illustration of an electrostatic feedback control system for detecting acceleration applied to the support system by substantially maintaining the sensing mass at a predetermined position between the opposite plates of the composite structure, the output of the system being an analog signal proportional to applied acceleration.
Figure 14:
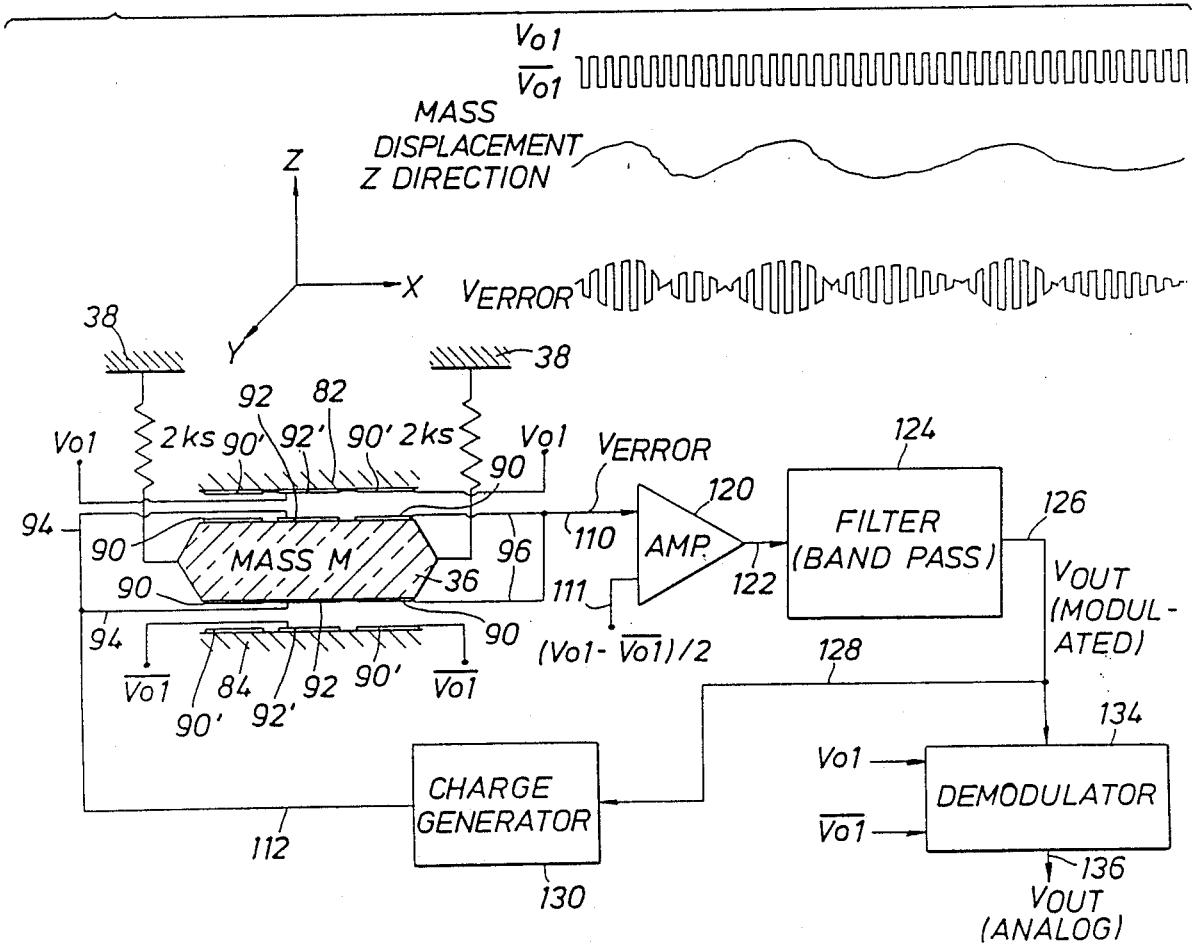
FIG. 14 shows a schematic illustration of a system similar to that of FIG. 13 but having an alternating voltage applied to the covering plate force and sense conducting areas, with a demodulator provided to develop an analog signal proportional to applied acceleration.

Turning now to the electronic circuitry associated with the spring mass transducer described above, three alternative embodiments of transducer systems, or accelerometers, are illustrated respectively in FIGS. 13, 14 and 15. FIG. 13 shows a mechanical schematic of the spring mass transducer of FIG. 11.

Mass 36 is supported from a support 38 via springs 40 having substantially equal spring constants of 2 ks. A d.c. voltage of magnitude $V_{cc}$ is applied between sense conducting areas 90' on plates of opposite support members 82, 84, which of course are fixed with support 38. A d.c. voltage of magnitude $V_{qq}$ (which may be the same as or different from magnitude $V_{cc}$) is applied between force conducting areas 92'. Leads 96 connected to top and bottom sense conducting areas 90 of mass 36 are connected to lead 110. Leads 94 connected to top and bottom force conducting areas 92 of mass 36 are connected to lead 112.

A differential amplifier 120 has one of its two inputs connected to lead 110 with another of its leads connected to a reference voltage which is provided with some fraction of magnitude $V_{cc}$, preferably, one half $V_{cc}$. The voltage appearing on lead 110 is proportional to the position of mass element 36 between the plates of support members 82 and 84, because a sense electric field is created between sense conducting plates 90' by voltage $V_{cc}$, and because sense conducting plates 90 of mass 36 are disposed in the path of that sense electric field. When the mass element 36 moves toward the plate of top support member 82, the voltage on sense plates 90 and lead 110 approach the magnitude $V_{cc}$; conversely, when the mass element 36 moves toward the plate of bottom support member 84, the voltage on sense plate 90 and lead 110 approaches zero or ground magnitude.

Consequently, with the reference voltage $V_{cc}/2$ applied to differential amplifier 20, its output on lead 122 is a sense displacement signal proportional to the distance that mass element 36 has moved from a reference position, halfway between the reference plate of supports 82, 84. The displacement signal produced on lead 122 is smoothed and filtered by filter circuitry 124, resulting in an output signal on lead 126.

The voltage $V_{qq}$ applied between force conducting areas of plates of top and bottom support members 82, 84, creates a force electric field across the force conducting areas 92 of mass 36. A negative feedback circuit, labelled as charge generator 130 (described below and illustrated in FIG. 15) produces an output on its output lead 112 in response to the output displacement signal from lead 128 to apply an amount and magnitude of electric charge on force conducting areas 92 to move the mass toward its reference position, preferably halfway between support members 82, 84. The force on mass 36 is proportional to the numerical product of the amount of charge deposited on plates 92 times the force electric field, provided the mass is maintained close to or at its reference position.

In other words, force or acceleration applied to support 38 causes displacement of the mass 36 via the springs 40. Displacement of the mass from a reference position is sensed as a displacement signal which causes a charge generator 130 to generate a charge which is applied to conducting areas 92 so as to drive the mass back to its reference position. Consequently, the difference between the sense displacement signal on lead 110 and the reference potential $V_{cc/2}$ applied to lead 120 is extremely small, yet the output displacement signal on lead 126 after amplification, and filtering of the output of differential amplifier 120 is representative of the displacement of mass 36 in response to acceleration applied to support 38.

As long as the frequency of applied acceleration is below the effective resonant frequency of the spring-mass-support transducer, displacement of the mass of the transducer is directly proportional to acceleration, and the system of FIG. 13 can be described as an accelerometer. Consequently, the output voltage signal of lead 126 is an analog signal proportional to acceleration for acceleration frequencies below the effective resonant frequency of the transducer.

FIG. 14 is a block diagram of an accelerometer similar to that of FIG. 13 but has an alternating voltage, preferably a square wave, applied between sense conducting areas 90' and force conducting areas 92' of the plates of opposite support members 82, 84. Different amplitudes of the square waves may be applied to the force and conducting areas. A square wave train, labelled $V_{o1}$, is illustrated in FIG. 14 representative of the alternating voltage applied to the force and sense conducting areas 92', 90' of the opposite plates. The frequency of the square wave-train is high compared to that of an illustration of the displacement of mass element 36 in response to acceleration applied to support 38. The voltage appearing on lead 110 is an amplitude modulated signal (suppressed carrier) representative of the displacement of mass 36 from a reference position.

The difference signal of differential amplifier 120 is applied to band pass filter 124 via lead 122 which results in a modulated displacement signal on lead 126. The charge generator circuit 130 produces modulated voltages to apply charge to force plates 92 of mass 36 in synchronism with the square wave voltage applied to force conducting areas 92' of opposite support members 82 and 84 to drive the mass to its reference position.

The voltage on lead 126 is applied to demodulator 134 along with $V_{o1}$ and $\overline{V}_{o1}$ inputs to produce an analog voltage on lead 136 representative of acceleration applied to supports 38 of the transducer. The advantage of the carrier system of FIG. 14, over the analog system of FIG. 13, is that the mass displacement signal is shifted out of the base band of the acceleration signal to a higher carrier signal of the square wave train thereby minimizing 1/f noise and d.c. offset problems.

The charge generator 130 of FIG. 13 is illustrated in detail in FIG. 15. The voltage from the output of the system of FIG. 13 is applied via lead 128 to charge generator 130. Two control signal voltages, $\phi_1$ and $\phi_2$ as illustrated in FIG. 15, are used to control conduction of MOS transistor pairs $Q_1$, $Q_2$ and $Q_3$, $Q_4$ respectively. Control signal voltages $\phi_1$ and $\phi_2$ provide non-coincident turn on signals of a period which is small compared to the period T of the highest frequency acceleration input to the system.

Capacitor $C_{REF}$ is disposed in the conduction path of transistors $Q_1$ and $Q_2$. Consequently when $Q_1$ and $Q_2$ are turned on by control voltage $\phi_1$, a charge is placed on $C_{REF}$ proportional to the output voltage $V_{out}$ on lead 128. A positive charge is placed on capacitor $C_{REF}$ if the output voltage $V_{out}$ is positive, and vice versa. After control voltage $\phi_1$ is turned off, transistor $Q_3$ and $Q_4$ are turned on by control voltage $\phi_2$ thereby placing the charge stored on capacitor $C_{REF}$ across the inputs of very high gain operational amplifier 137. In response, the output of amplifier 137 changes in a direction that causes the charge stored on capacitor $C_{REF}$ to discharge. Lead 112 is connected between force plates 92 of the mass 36 of the sensor. Consequently, the discharge path for the charge stored on capacitor $C_{REF}$ is through the capacitance of the force electrodes 92 via lead 112. The charge on the reference capacitance $C_{REF}$ is totally transferred to force electrodes 92.

As long as control voltage $\phi_1$ is in the off condition, or the $\phi_1$ signal is applied to transistor pair $Q_7$, $Q_8$, voltages $V_{gg}$ and ground are applied respectively to corresponding force plates 92' of the top and bottom support plates 82, 84. During the time when control signal $\phi_1$ is positive and $\phi_1$ is not present, transistor pair $Q_5$, $Q_6$ conduct and cause top and bottom pairs of plates 92' and 92 to be connected together, thereby equalizing charge on the respective plates.

The circuit 130 could be modified such that the voltage $V_{gg}$ is constantly applied to $Q_1$ on lead 128 and the output signal from lead 126 is applied to transistor $Q_7$. This causes a fixed value of charge to be applied to plates 92 while the voltage across plates 92' is equal to the output voltage on lead 126.

The circuit could also be modified such that positive and negative voltages are applied respectively to plates 92' (or 92 as indicated above) such that the electric field across plates 92' is the difference between the positive voltage and the negative voltage. Likewise, the voltage applied across capacitor $C_{REF}$ may be a negative voltage rather than ground as illustrated. Such modification will be apparent to one of skill in the electronic design art.

The charge generator 130 of FIG. 14 is similar to that illustrated in FIG. 15 except that the control signal voltages $\phi_1$ and $\phi_2$ are in synchronism with the modulation signal $V_{o1}$.

FIGS. 16 through 19 illustrate different arrangements of the embodiment of the invention where a binary bit stream representation of the displacement of the mass 36 is fed back to the mass-spring-support structure to generate a binary force on the mass in a direction tending to restore the mass to its reference position.

FIG. 16 illustrates a support 38-spring-mass 36 system which is similar to the d.c. system of FIG. 13 in that a displacement signal on lead 110 is applied to a differential amplifier 120 having a reference potential $V_{01/2}$ applied to it corresponding to a reference position of mass 36 between support plates 82 and 84. A difference signal on lead 112 is applied to a filter 124. The output of filter 122 on lead 126 is then applied to a binary sampler 150 which is illustrated in FIG. 16A. The filtered differential displacement signal on lead 126 is applied to a threshold circuit 160 which produces a "1" ("high") or "0" ("low") signal on lead 161 depending on whether the displacement signal on lead 126 is greater than or less than a voltage threshold signal applied to lead 159.

Consequently, the signal on lead 161 is either a "1" or a "0".

The binary signal on lead 161 is applied to flip flop circuit 162 to which is applied a clock signal labeled $T_{CLOCK}$ and which is illustrated in FIG. 16. The flip flop circuit produces outputs on its Q and Q leads 164, 166 which is a binary stream of pulses, as illustrated in FIG. 16.

When the signal on lead 161 is a "1", the binary stream on the Q output (lead 164) is a stream of "1" pulses each of the same period as the pulses of the $T_{CLOCK}$ signal. Simultaneously, the Q output (lead 166) is a binary stream of "0" pulses each of the same period. The bit streams are reversed when the signal on lead 161 is a "0". The illustration of "1"'s and "0"'s shown in FIGS. 16, 17, 18 and 19 is an accurate representation of how this signal will appear for a sigma delta modulation encoder.

Figure 17:
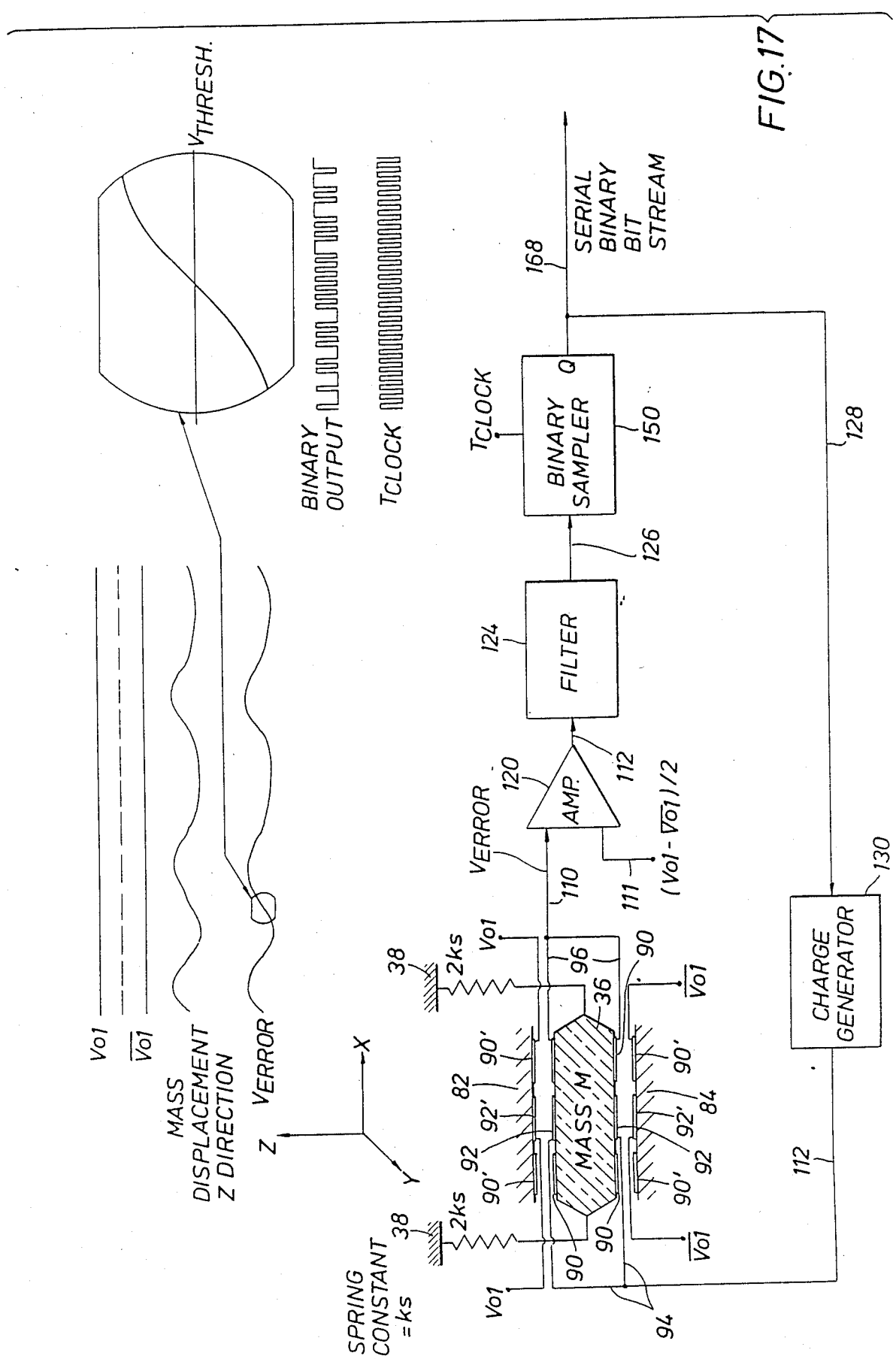
FIG. 17 is similar to the transducer of FIG. 16 except that a binary bit stream of charge is applied to the force plates of the mass and a constant electric field is applied across the force plates of the top and bottom plates.

It is preferred that the accelerometer of FIG. 16, as well as those of FIGS. 17-19, have very high noise reduction characteristics. In order to achieve such noise reduction the preferred embodiment of FIG. 16 and those of FIGS. 17-19 includes one or more integrators in the forward loop. With such an integrator, for example in conjunction with filter 124, the filter-integrator 124 and binary sampler 150, with feedback of the output signal to the mass 36 to be summed with the input signal applied to support 38, is defined as a sigma-delta-modulation system. It is preferred to have a single integrator in the forward loop, thus achieving a first order sigma-delta-modulation system. Lower or higher order systems may find application with the invention of FIGS. 16-19. Sigma delta modulation systems are described in an IEEE publication, "Stability Analysis of High-Order Sigma-Delta Modulators", by Ardalan and Paulos, CH 2255 - 8/86/0000-0715, 1986.

The output binary bit stream of a sigma delta modulation system is mostly alternating bit patterns with the density of "1"'s versus "0"'s being the representation of the acceleration input. In the embodiment of FIG. 16, the voltage bit streams on leads 164 and 166 are applied to force conducting plates 92' of the top and bottom support members 82, 84.

A constant charge is applied to force conducting plates 92 of mass 36 via charge generator 130 and leads 112, 94. Consequently, the force electric field across the mass 36 is applied in a series of binary voltage pulses to the support member conducting plates to drive mass 36 to its reference position as determined by the d.c. reference potential $V_{01/2}$. The binary bit stream applied to plates 92' reverses in polarity of its bit density as the displacement signal on lead 126 crosses the threshold voltage level applied to threshold circuit 160. Such reversal of polarity of the bit streams on leads 164, 166 causes the mass 36 to be driven in the opposite direction.

The charge generator circuit 130 is similar in construction to that illustrated in FIG. 15 except that a constant voltage V is applied to lead 128 which causes a constant amount of charge to be applied to conducting plates 92 of mass 36.

The output of the transducer of FIG. 16 on lead 168 is a serial binary bit stream of 0's or 1's representative of the displacement of the mass 36 with respect to a reference position as specified by the reference potential $V_{01/2}$ applied to amplifier 120. As discussed previously, displacement of the mass 36 is proportional to acceleration applied to support 38 of the mass 36 spring support 38 system.

FIG. 17 is an alternative binary bit stream embodiment of the transducer, similar to the transducer of FIG. 16, except that a d.c. potential difference $V_{01} - \overline{V}_{01}$ is applied across force conducting plates 92' of top and bottom plates 82, 84. The binary bit stream output from the Q output of binary sampler 150 is applied to lead 128 to charge generator 130, which in response, applies "1"'s or "0"'s of charge to force conducting plates 92 via leads 112 and 94. In other words, the embodiment of FIG. 17 is the inverse arrangement of that of FIG. 16 in that a constant voltage is applied to force plates 92' of the top and bottom plates, but binary charge proportional to displacement of the mass 36 (in response to acceleration applied to support 38) is applied to the force plates 92. As before, mass 36 is driven in a direction toward its reference position as determined by the voltage $(V_{01} - \overline{V}_{01})/2$ applied to amplifier 120. The output on lead 168, like that of FIG. 16, is a serial binary bit stream proportional to acceleration applied to the support 38 of the transducer.

FIG. 18 is another alternative arrangement of the embodiment of the invention having a binary bit stream output and feedback which is representative of displacement or acceleration applied to the transducer. The arrangement of FIG. 18 is similar to the analog embodiment of FIG. 14 in that it applies an a.c. carrier voltage (square wave) to modulate the force electric field on force plates 92' and to sense plates 90' of top and bottom supports 82, 84. The arrangement of FIG. 18 is also similar to the binary output arrangement of FIG. 17 in that a binary stream of charge pulses, (but in this arrangement modulated by the carrier signal $V_{01}$) is fed back to force plates 92 of mass 36 in response to the operation of digital sampler 150. Like in FIG. 17, the digital sampler 150 produces a binary bit stream on lead 168, but modulated by signal $V_{01}$, representative of displacement signal 126. Charge generator 130 produces a modulated binary bit stream on leads 112 and 94 in response to voltage bits applied on lead 128 from lead 168. The modulated bit stream on lead 168 is demodulated by demodulator 153 (in a similar fashion as the analog signal on lead 126 of FIG. 14 is demodulated) to produce a binary bit stream on lead 170 representative of displacement or acceleration applied to the transducer.

FIG. 19 is similar to FIG. 18, but feeds a modulated binary bit stream of voltage pulses back to plates 92' of top and bottom support plates 82, 84 and applies modulated charge, but of constant magnitude, to force plates 92 of mass 36. The result, after demodulation of the modulated binary bit stream signal on lead 152 by demodulator 153 is a serial binary bit stream representation of the displacement or acceleration applied to the transducer system.

Application of Micro-Machined Accelerometer to determine direction of a source of sound waves in a body of water One application of the micro-machined accelerometer based on the principles described above is described in FIGS. 20A, 20B, and 20C. Such figures schematically describe a system for determining the direction of a source of sound waves S in a body of water. It is known that sound waves in water produce acceleration forces in the water as the sound propagates in the water. Measurement of the components of acceleration produced by such sound wave allows determination of the vector from the location of measurement to the source of the sound.

FIG. 20A illustrates an arrangement for measuring such sound direction including a buoy 1004 floating on the surface 1002 of the body of water 1000. A submerged platform 1006 is attached to the buoy 1004 by means of a cable 1008. Platform 1006 has two accelerometers Ax (reference number 1010) and Ay (reference number 1012) mounted on it along x and y platform axes which are perpendicular to a third z axis which is directed along the cable 1008 connected between platform 1006 and buoy 1004. The z axis is defined to be along the gravity axis between the buoy and the center of the earth. The accelerometers Ax, Ay measure accelerations applied to platform 1006, such as the accelerations ax and ay due to a sound source S illustrated in FIG. 20A.

FIG. 20B illustrates platform 1006 tilted about the y axis. In this condition an x component of gravitational acceleration acts on the mass of the accelerometers. The angular tilt $\theta x$ about the y axis can be determined by determining gxp, the component of gravitational acceleration measured along the platform x axis. Since the gravitational vector gz is known, $\theta_x$, the angle of tilt about the y axis may be determined as, $$\theta_x = \sin^{-1} \frac{gxp}{gz}$$

It follows that the acceleration due to sound waves in the x direction as measured along the xp axis by accelerometer $A_x$ is determined by, $$a_x = \frac{a_{xp}}{\cos \theta_x}$$

FIG. 20C illustrates platform 1006 tilted about the x axis. In this condition, a y component of gravitational acceleration acts on the mass of the accelerometer. The angular tilt $\theta_y$ about the x axis can be determined by determining $g_{yp}$, the component of gravitational acceleration along the platform y axis. Since the gravitational vector $g_z$ is known, $\theta_y$, the angle of tilt about the xp axis is determined as $$\theta_y = \sin^{-1} \frac{g_{yp}}{g_z}$$

The acceleration due to sound waves in the y direction as measured along the yp axis by accelerometer $A_y$ is determined by, $$a_y = \frac{a_{yp}}{[\cos \theta_y]}$$

The tilting of platform 1006 moves slowly as compared to the frequency of accelerations $a_y$ and $a_x$ due to sound source S. Consequently, the transducer described previously in this specification is modified so as to have low frequency analog feedback loop, by which the gravitational acceleration sensed by the spring-mass system of the transducer due to tilt is determined, in addition to the sigma-delta loop at higher frequencies for precisely determining acceleration along a platform axis due to sound waves. This frequency separation of measuring acceleration along a platform axis depends upon the physical characteristics of two components of acceleration along a platform axis being measured. In the application described in FIGS. 20A-20C the frequency content of the accelerations due to the sound waves is much higher than the gravitational acceleration caused by tilt of the platform. This difference in frequency of the two components of the total acceleration applied to the accelerometer allows acceleration due to the sound source to be measured separately from gravitational acceleration and to be electronically compensated for the tilt of the platform. An important advantage of such separate measurements of the components of acceleration is the decrease of the required dynamic range of the measurement of acceleration due to the sound source. In other words, the sigma delta loop of the higher frequency measurement of acceleration due to the sound source need not include measurement of the gravitational acceleration due to tilt, resulting in a lower dynamic range required for the measurement of acceleration due to the sound source.

Figure 21:
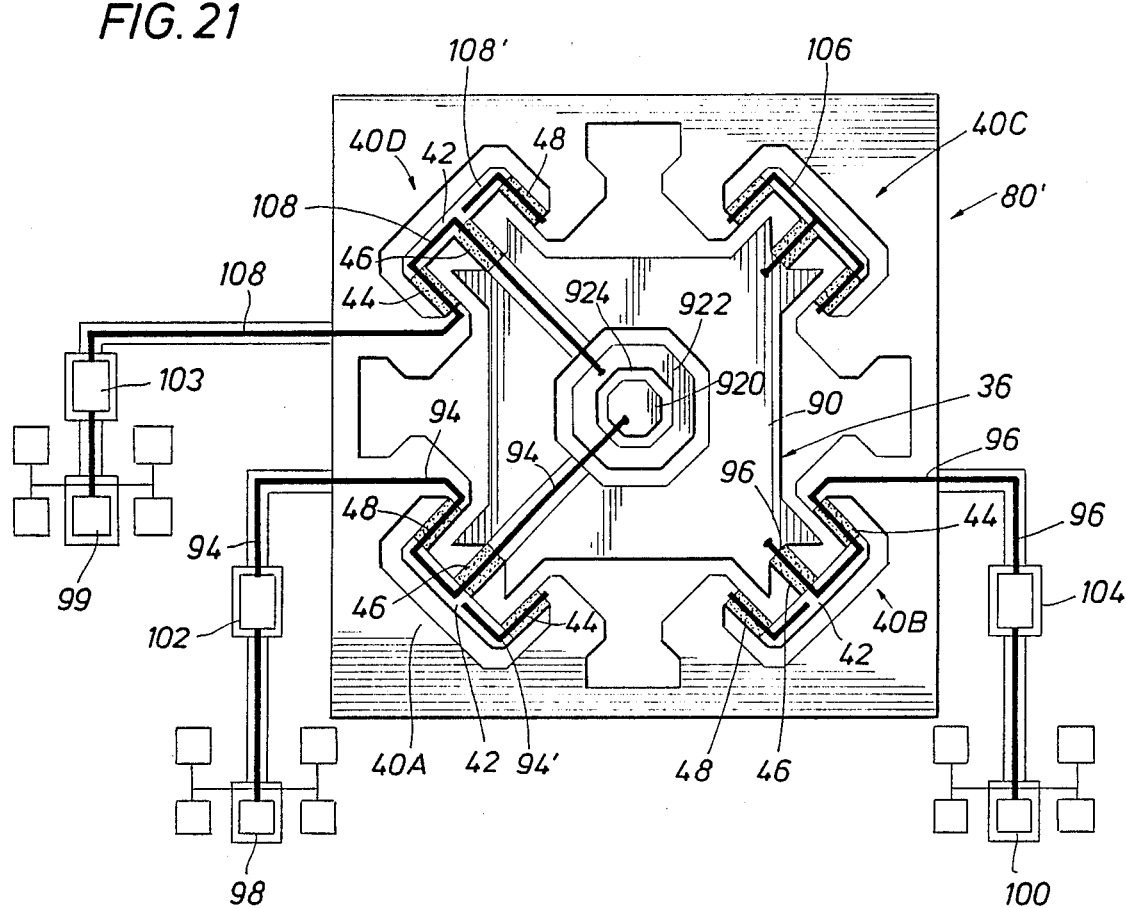
FIG. 21 is a plan view of the mass and spring members of the sensing element of the transducer modified to include a gimbal force plate on the mass.
Figure 22:
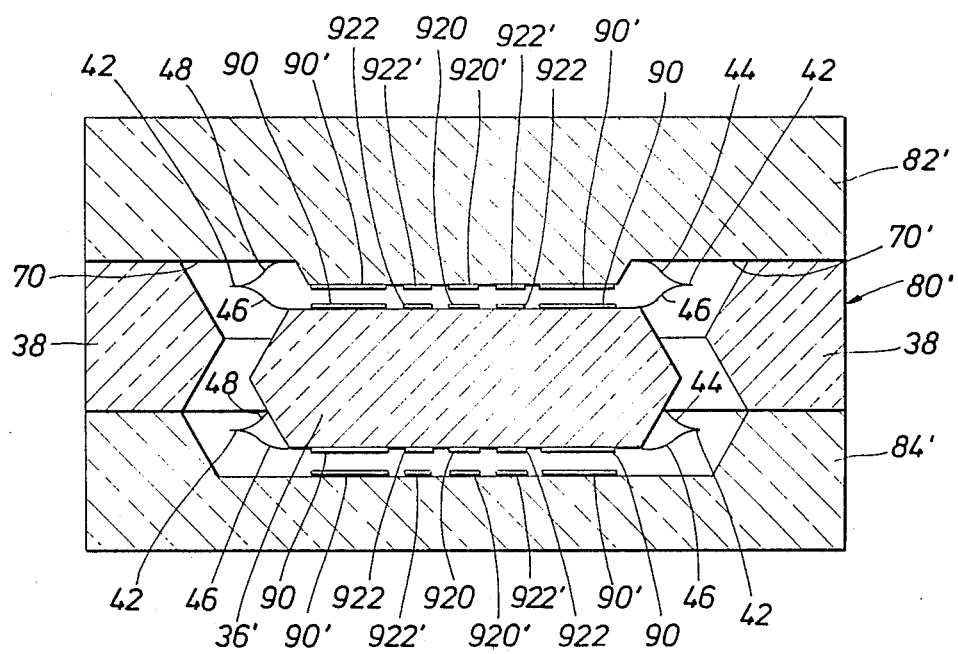
FIG. 22 is a vertical cross-section through the sensing element illustrating sense, force, and gimbal force conducting areas on the mass and corresponding conducting areas on plates attached to a supporting member and which face the conducting areas on the mass.

FIGS. 21 and 22 illustrated a modified transducer from that illustrated in FIGS. 12 and 11 by which an additional force plate, called "gimbal force" plate (reference number 922), is added to provide an additional feedback path by which the mass 36' is maintained at a predetermined position between plates 82' and 84' by an additional or "gravitational" feedback loop. The sensor itself is next described followed by a description of alternative arrangements of feedback loops.

The transducer of FIGS. 21 and 22 are identical to that described in FIGS. 12 and 11 except that two force plates 920 (labeled FORCE) and 922 (labeled GIMBAL FORCE) (instead of one force plate 92 of FIG. 12) are provided with conductive material on top and bottom surfaces of the silicon mass 36'. Such force conducting areas are electrically isolated from each other by nonconducting area 924. Conductor 108 is provided from a location external of the mass 36' and springs to the gimbal force area 922. Conductor 108 is illustrated for one surface of the support-spring-mass structure 80', but is also provided to the opposite parallel surface. Conductor 108, like conductors 94 and 96, preferably gold, is deposted on opposite surfaces of the wafer. It runs from connecting pad 99 via E-spring 40D by running along springs 44 and 46 via base 42. The lead 108 passes through tunnel 103 provided for a seal (not shown) between sandwiched surfaces of support member 38 and opposite supporting members 82' and 84'. Conductor 108' is deposited on opposite leg 48 and a portion of base 42 of spring 40D to balance the weight and stiffness of conductor 108 on leg 44 and base 42. Conductor 108' is not electrically connected to conductor 108.

As shown by FIG. 22, the top and bottom plates 82', 84' which are secured to support member 38 have planar surfaces which face top and bottom planar surfaces of mass 36'. Such top and bottom plates 82', 84' have sense conducting material 90' deposited thereon which oppositely face the sense conducting material 90 on mass 36'. Such material 90' is formed in a substantially identical pattern as the sense 90 conducting material. Likewise, patterns 922' on top and bottom plates 82', 84' face substantially identical patterns 922 on mass 36' to form "gimbal force" opposing plates. Patterns 920' on top and bottom plates 82', 84' face substantially identical patterns 920 on mass 36' to form "force" opposing plates.

The spring mass system, together with frame top and bottom plates 82', 84', are vacuum sealed to the top and bottom connections to support member 38. A vacuum environment is provided between opposing faces of top and bottom plates 82', 84' and mass 36' to avoid non-linear viscous damping. Damping of the spring mass system subjected to an acceleration input is controlled electromechanically by the closed loop feedback system described below.

The top and bottom plates 82', 84' are fabricated of 500 micron thick silicon, such that they are thermally matched to the silicon of mass 36'. The gaps between the surfaces of mass 36' and the opposing surfaces of top and bottom plates 82', 84' are approximately 1.5 microns in distance.

Figure 23:
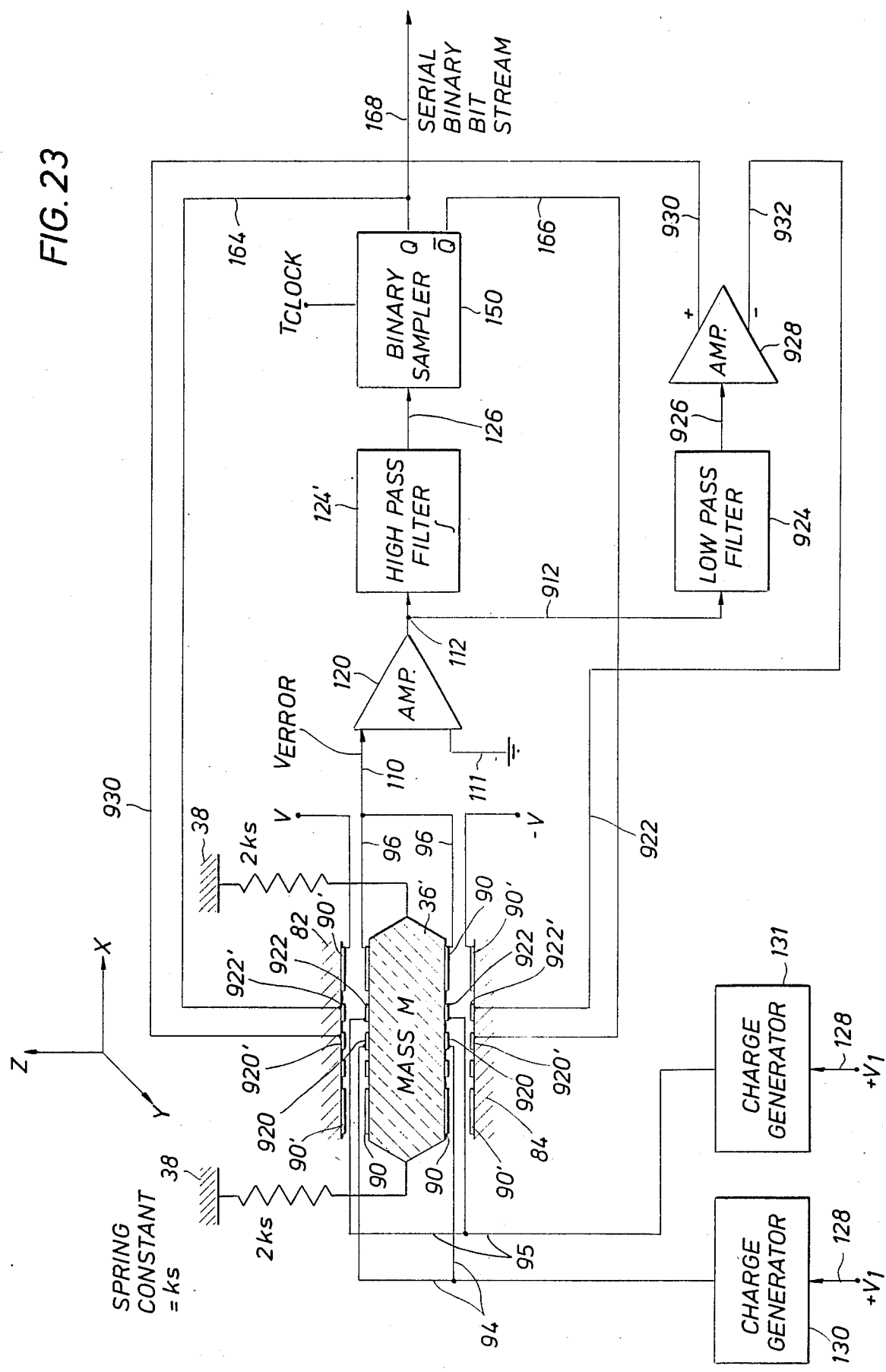
FIG. 23 is a schematic diagram of an accelerometer showing two feedback loops for maintaining the mass of the sensing element at a position between opposing facing plates above and below the mass, where a low frequency loop is responsive to slowly varying gravitational acceleration due to the tilt of a platform on which the sensor is placed and a high frequency loop is responsive to high frequency accelerations.

Turning now to FIG. 23, the spring mass sensor is connected in a first arrangement to ultimately determine acceleration applied to support 38 along an axis of sensitivity Z. Of course such axis of sensitivity may be oriented along any axis, such as illustrated in FIGS. 20A-20C where accelerometers according to the invention are placed on platform 1006 to be sensitive to x and y platform axes.

The schematic of FIG. 23 shows that mass 36' is supported from support 38 via springs having substantially equal spring constants of 2 ks. A d.c. voltage of plus V and minus V is applied across sense conducting areas 90' on plates of opposite support members 82', 84' which of course are fixed with support 38.

A differential amplifier 120 has one of its two inputs connected to lead 110 with another of its leads connected to a reference voltage, preferably ground. Lead 110 is connected to sense conducting surfaces 90 of mass 36'. The voltage appearing on lead 110 is proportional to the position of mass element 36' between the plates of support members 82' and 84'. Consequently with the ground reference applied to differential amplifier 120, its output on lead 112 is a sense displacement signal proportional to the distance that mass element 36' has moved from a reference position, halfway between the reference plate of supports 82, 84.

Two feedback loops are provided. The first includes a high pass filter 124', binary sampler loop with binary feedback to force support plates 920'. The second includes a low pass filter 924 with analog feedback to "gimbal force" support plates 922'. For each feedback loop, a constant charge is maintained on mass force plates 920 and mass gimbal force plates 922 via leads 94 and 95 from charge generators 130 and 131. Such generators are described above with reference to FIG. 15.

The low pass filter 924 and high pass filter 124' are illustrated by way of their frequency responses in FIGS. 25A and 25B. The low frequency analog loop includes low-pass filter 924 which has a high frequency cut-off frequency of about 0.7 HZ. Its response increases in attenuation at frequencies above such cut-off frequency at a rate of about 20 db per increasing decade of frequency.

The delta-sigma binary bit stream loop includes high-pass filter 124' which has a low frequency cut-off frequency of about 700 HZ at about 20 db per decreasing decade of frequency. Its response decreases in attenuation at frequencies below about 700 HZ. Filters 924 and 124' may be realized by filter circuitry well known in the art of analog filter design.

Returning to FIG. 23, the displacement error signal after amplification and high pass filtering is applied on lead 126 to binary sampler 150 which produces a serial binary bit stream on lead 168. That bit stream, representative of the displacement of mass 36' in response to acceleration, is applied via lead 164 to top support force plate 920', while the complementary binary bit stream on lead 166 is applied to bottom support force plate 920' Such binary bit voltages applied to top and bottom force plates 920' and the constant charge applied to mass force plates 920 cause mass 36' to move in a direction to null the voltage or "$V_{ERROR}$" on lead 110. Such high frequency loop is effective at frequencies passed by filter 124.

The low frequency loop responds to accelerations passed by filter 924. The displacement at such frequencies are filtered via filter 924 and applied via lead 926 to amplifier 928, where a voltage of opposite sign to the input voltage on lead 926 is applied via lead 930 to top support gimbal force plate 922' and a voltage of the same sign is applied via lead 932 to bottom support gimbal force plate 922'. Such analog voltages applied to top and bottom gimbal force plates 922' and the constant charge applied to mass gimbal force plates 920 cause mass 36' to move in a direction to null the voltage or "$V_{ERROR}$" on lead 110. Such low frequency loop is effective at low frequencies passed by filter 924.

As will be apparent to one of skill in the field of negative feedback or automatic feedback controls as applied to sensor design, each of the two feedback loops must be stable. Depending on the components used to implement the low frequency loop and the delta-sigma binary bit stream loop of FIG. 23 (and of other loops presented herein), it may be advantageous to provide a lead compensator in one or both loops. A simple lead compensator may be combined with filter 124', for example in the binary loop, if a stability analysis of the loop so requires, of the form of a parallel resistor $R_1$ and capacitor C followed by a resistor $R_2$ to ground. The output/input relation G(S) of such a lead compensator, written in terms of Laplace transform operator S is of the form $$G(S) = \frac{S + 1/T}{S + 1/\alpha T}$$

where $T = R_1 C$, $\alpha = R_2/R_1 + R_2$.

When used in the application as illustrated in FIGS. 20A—20C, the accelerometer of FIG. 23 effectively uses the low frequency analog feedback loop to separately measure the low frequency gravitational effects on platform 1006. Thus, the terms "electronic gimbal" and "gimbal" force plates are applicable. The high frequency feedback loop of the accelerometer measures high frequency accelerations along the $x_p$ and $y_p$ axes of platform 1006, independent of the gravitational acceleration caused by tilt. In effect, the platform is electronically gimbled (as if it were mechanically oriented to be perpendicular to the true gravity vector), to eliminate substantially the effect of tilt and gravity. Of course, the low frequency loop or electronic gimbal reduces the required dynamic range of the higher frequency measurement of accelerations due to a sound source.

FIG. 26 illustrates other components of the system used in conjunction with accelerometers 1010 (accelerometer $A_x$) and accelerometer 1012 (accelerometer $A_y$) which are of the design of FIG. 23 (or the alternative designs discussed previously or below). The output of the high frequency loop on lead 168' is a serial binary bit stream representative of acceleration due to sound source S along platform axis xp. It is applied to digital computer 1014. The output of the low frequency loop on lead 930' is an analog representation of acceleration due to gravitational acceleration along the platform axis xp due to the tilt of platform 1006. It can be digitized by a simple conventional analog to digital converter or the amplifier could be replaced with the binary sampler to form a low frequency $\Sigma$-$\Delta$ loop.

Similarly, accelerometer 1012 produces a serial binary bit stream on lead 168" representative of the acceleration due to sound source S along platform axis yp. The output of the low frequency loop on lead 930" is an analog representation of acceleration due to gravitational acceleration along platform axis yp due to the tilt of platform 1006. The analog signals are applied respectively to A/D converters 1014 and 1016 to produce digital representations of $g_{xp}$ and $g_{yp}$, the measured gravitational accelerations along the x and y platform axes.

Digital computer 1018 is programmed to determine the tilt angles $\theta_x$ and $\theta_y$ from the known magnitude of the gravitational acceleration of the accelerometer in an untilted platform. After determination of such angles $\theta_x$ and $\theta_y$, the accelerations $a_{xp}$ and $a_{yp}$ are converted to untilted accelerations along x and y axes of the platform. Of course, ancillary measurements of the angular orientation of the x and y axes of the platform are necessary due to the floating buoy and suspended platform. Such orientation may be determined by mounting a compass on such platform. With such compass information, accelerations determined as above along untilted x and y axes of the platform 1006 may be translated to provide an acceleration vector in the direction of sound source S.

Figure 24:
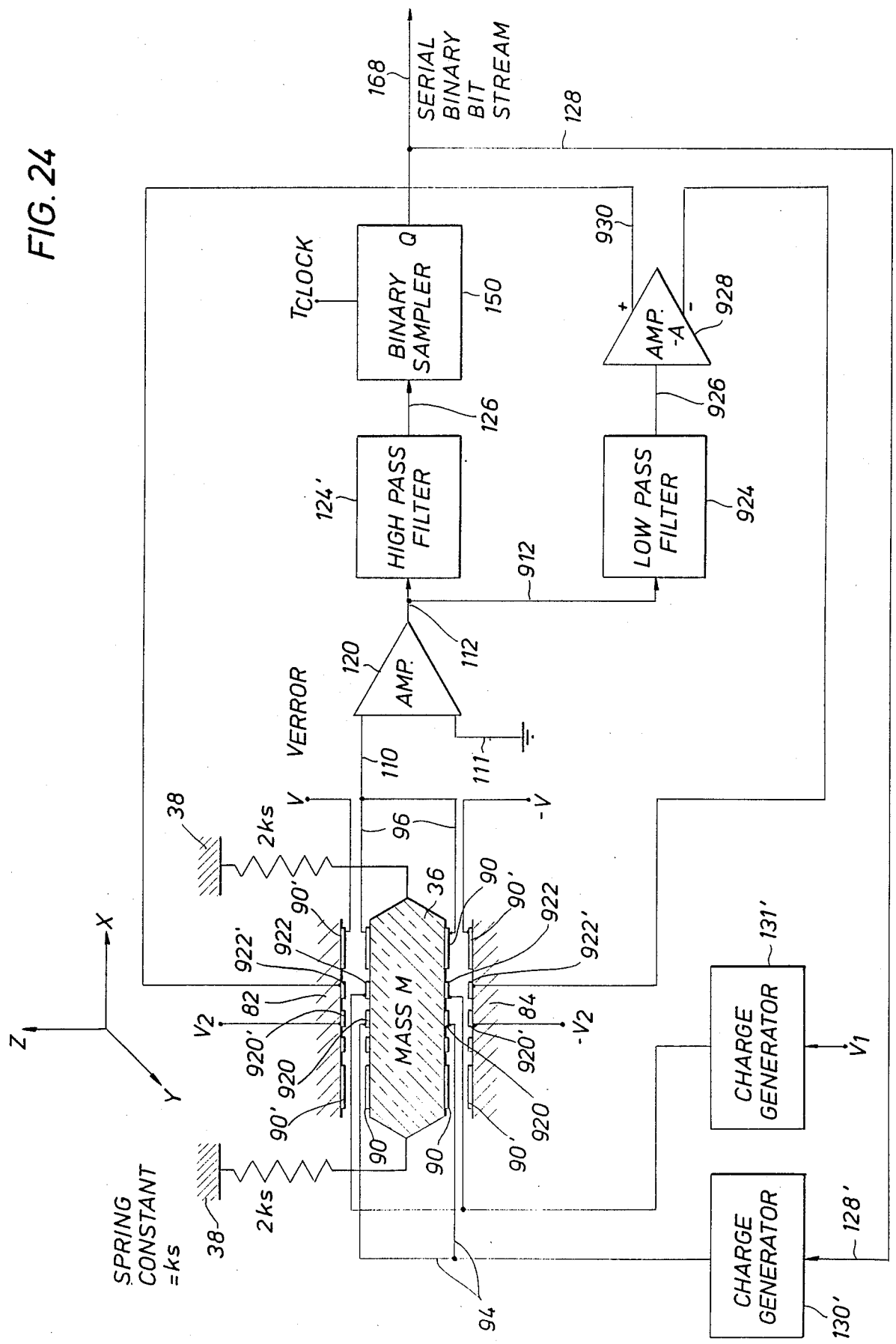
FIG. 24 is a schematic diagram of an accelerometer similar to that of FIG. 23 but with an alternative technique for applying electrostatic feedback forces to the mass.

The alternative accelerometer embodiment of FIG. 24 is similar to FIG. 23, but applies constant voltage $V_2$, $-V_2$ across top and bottom force support plates 920'. The serial binary bit stream on lead 168 is applied via lead 128' to charge generator 130' which applies a corresponding serial bit stream of charge to mass force plates 920 via leads 94. The analog signal is provided in a manner identical to that of FIG. 23. The embodiment of FIG. 24 may be used as accelerometers 1010 and 1012 as discussed above.

It is apparent that the embodiments of FIGS. 23 and 24 may be modified to use a.c. modulation in a manner described in FIGS. 18 and 19 as discussed above.

Various modifications and alternatives in the described structures will be apparent to those skilled in the art of the foregoing description which does not depart from the spirit of the invention. For example, although the preferred method of fabricating the force transducer is by chemical etching of a semi-conductor wafer, plasma etching may also be used effectively. Although the preferred N$^-$ doping of the spring bases and other regions is arsenic, boron or phosphorous may also be used depending upon the original crystal type. Although the preferred method of sensing the displacement of the mass of the mass-spring-support system is by electric field means, a displacement signal representative of the position of the mass between the top and bottom support plates may be generated by piezoresistors or piezoelectric elements disposed on or in the springs which change their resistance or output voltage depending on the flex of the springs. A current through such piezoresistors would produce a voltage signal used in the same way as the voltage signal of the source conducting plates as described above with the preferred embodiments of the invention. For this reason, these changes are desired to be included in the appended claims. The appended claims recite the only limitations to the present invention and the descriptive manner which is employed for setting forth the embodiments and is to be incorporated as illustrative and not limitative.

What is claimed is:

1. A transducer comprising,
   sensing means for generating a displacement signal of a mass from a reference position with respect to a support structure,
   first forward circuit means including high pass filter means responsive to said displacement signal for creating a high-pass filtered displacement signal and converting same to an output binary bit stream representative of said high-pass filtered displacement signal,
   second forward circuit means including low pass filter means responsive to said displacement signal for creating a low pass filtered displacement signal, and converting same to an output low frequency signal representative of said low pass filtered displacement signal,
   first feedback circuit means responsive to said output binary bit stream for generating a binary force on said mass in a direction tending to restore said mass to said reference position,
   second feedback circuit means responsive to said output low frequency signal for generating a low frequency force on said mass in a direction tending to restore said mass to said reference position,
   whereby said output binary bit stream is representative of a characteristic of motion of said support structure at frequencies passed by said high pass filter, and
   said output low frequency signal is representative of a characteristic of motion of said support structure at frequencies passed by said low pass filter.

2. The transducer of claim 1 wherein said mass is supported by springs from said support structure, and wherein
   said mass has a surface with a sense conducting area and first and second force conducting areas, and
   said mass is free to move between corresponding opposing sense conducting areas and corresponding opposing first conducting areas and corresponding opposing second conducting areas on plates which face said surface of said mass and which are secured to said support structure.

3. The transducer of claim 2 wherein said displacement signal is generated on said sense conducting area of said mass by applying a d.c. potential across said opposing sense conducting areas of said plates secured to said support structure,
   said binary force on said mass is generated by applying complementary binary bit streams to said opposing first force conducting areas of said plates secured to said support structure and by applying a constant charge to said first force conducting area of said mass, and
   said low frequency force on said mass is generated by applying said output low frequency signal differentially respectively to said opposing second conducting areas of said plates secured to said support structure and by applying a constant charge to said second force conducting area of said mass.

4. The transducer of claim 2 wherein said displacement signal is generated on said source conducting area of said mass by applying a d.c. potential across said opposing sense conducting areas of said plates secured to said support structure, and said binary force on said mass is generated by applying a d.c. potential across said opposing first force conducting areas of said plates secured to said support structure and by applying a binary bit stream of charge, proportional to said output binary bit stream, to said first force conducting area of said surface of said mass.

* * * * *